United States Patent
Hoshi

(10) Patent No.: US 6,606,202 B2
(45) Date of Patent: Aug. 12, 2003

(54) ZOOM LENS SYSTEM AND OPTICAL APPARATUS USING THE SAME

(75) Inventor: Koji Hoshi, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 09/966,416

(22) Filed: Sep. 26, 2001

(65) Prior Publication Data

US 2002/0089762 A1 Jul. 11, 2002

(30) Foreign Application Priority Data

Sep. 26, 2000 (JP) ........................ 2000-292875
Aug. 8, 2001 (JP) ........................ 2001-240397

(51) Int. Cl.$^7$ ............................................. G02B 15/14
(52) U.S. Cl. ........................................... 359/687
(58) Field of Search ..................................... 359/687

(56) References Cited

U.S. PATENT DOCUMENTS

| | | | | |
|---|---|---|---|---|
| 4,240,699 A | * | 12/1980 | Sato et al. | 359/687 |
| 4,372,654 A | * | 2/1983 | Fujioka et al. | 219/152 |
| 5,189,558 A | | 2/1993 | Ishii et al. | 359/687 |
| 5,572,277 A | | 11/1996 | Uzawa et al. | 359/686 |
| 5,585,966 A | | 12/1996 | Suzuki | 359/557 |
| 5,963,378 A | * | 10/1999 | Tochigi et al. | 359/687 |
| 6,166,864 A | * | 12/2000 | Horiuchi | 359/687 |
| 6,473,231 B2 | * | 10/2002 | Hamano et al. | 359/557 |

FOREIGN PATENT DOCUMENTS

| | | |
|---|---|---|
| JP | 62-24213 | 2/1987 |
| JP | 62-206516 | 9/1987 |
| JP | 63-247315 | 10/1988 |
| JP | 4-43311 | 2/1992 |
| JP | 5-113538 | 5/1993 |
| JP | 7-128619 | 5/1995 |
| JP | 7-270684 | 10/1995 |
| JP | 7-318804 | 12/1995 |
| JP | 7-5361 | 11/1996 |
| JP | 7-199124 | 12/1996 |
| JP | 11-305124 | 11/1999 |

* cited by examiner

Primary Examiner—Scott J. Sugarman
Assistant Examiner—Darryl J. Collins
(74) Attorney, Agent, or Firm—Morgan & Finnegan, L.L.P.

(57) ABSTRACT

There is provided a zoom lens system of one aspect of the present invention includes, in order from an object side, a first lens unit of positive refractive power that doesn't move along an optical axis for zooming, a second lens unit of negative refractive power that moves along the optical axis for zooming, a third lens unit of positive refractive power that doesn't move along the optical axis for zooming, the third lens unit including, in order from the object side, a first lens subunit of positive refractive power consisting of one or two positive lens element facing to the object side a convex surface of refractive power that is stronger at the object side than an image side, and a second lens subunit including a cemented lens coupling a concave surface of a negative lens element of refractive power that is stronger at the image side than at the object side, with a convex surface of a positive lens element of refractive power that is stronger at the object side than at the image side, and a fourth lens unit of positive refractive power.

66 Claims, 19 Drawing Sheets

US 6,606,202 B2

ZOOM LENS SYSTEM AND OPTICAL APPARATUS USING THE SAME

BACKGROUND OF THE INVENTION

The present invention relates to a zoom lens system and optical apparatus using the same, and more particularly those suitable for video cameras, digital cameras, and cameras using a film.

Along with the recent advance of high performance and miniaturization of cameras (or optical apparatuses), such as video, digital, and electronic still cameras using a charged-coupled device (CCD), and film cameras using a film, an optical system for use with them has been required to meet both high optical performance and miniaturization.

Among a lens system used for an optical apparatus, such as video and digital still cameras, a four-unit zoom lens includes four lens units of positive, negative, positive and positive refractive powers, more specifically, it includes, in order from the object side, a first lens unit of positive refractive power that is fixed during zooming and focusing, a second lens unit of negative refractive power that moves along the optical axis and exhibits a zooming operation, a third lens unit of positive refractive power that is fixed during zooming and focusing, and a fourth lens unit of positive refractive power that moves during zooming and focusing. This four-unit zoom lens exhibits the high optical performance by composing the first lens unit of a cemented lens of a concave lens (or negative lens) and a convex lens (or a positive lens), the second lens unit of two concave lenses and a convex lens, the third lens with one or two convex lenses and a concave lens.

For example, U.S. Pat. Nos. 5,963,378 and 6,166,864 each disclose a zoom lens including, in order from the object side, a fixed first lens unit of positive refractive power, a zooming second lens unit of negative refractive power, a fixed condenser third lens unit of positive refractive power, and a fourth lens unit of positive refractive power that moves along an optical axis to maintain a position of an image plane.

Japanese Laid-Open Patent Applications Nos. Sho 62-206516, Sho 62-24213, Sho 63-247316, and Sho 63-247316, U.S. Pat. No. 5,189,558 disclose another type of four-unit zoom lens including, in order from the object side, a first unit of positive refractive power, a second unit of negative refractive power, a third unit of positive refractive power, and a fourth unit of positive refractive power, wherein the second unit moves and zooms, and the fourth unit corrects fluctuations of the image plane along with the zooming and conducts focusing.

Characteristically, this rear focus type of four-unit zoom lens may easily obtain the predetermined zoom range and easily miniaturize the entire lens system.

On the other hand, various vibration resistant optical systems that serve to prevent blurs in a shot image have been conventionally proposed.

For example, Japanese Laid-Open Patent Application No. Hei 7-128619 discloses a four-unit zooming optical system including four lens units of positive, negative, positive and positive refractive powers, wherein the third lens unit comprises two lens units of positive and negative refractive powers, which lens unit of positive refractive power is made vibratory for vibration resistant purposes.

U.S. Pat. No. 5,585,966 discloses a four-unit zooming optical system including four lens units of positive, negative, positive and positive refractive powers, wherein third lens unit is vibrated for vibration resistant purposes.

Characteristically, these lens units do not require a specific optical member such as a prism, to prevent vibrations, and facilitates the vibration resistance.

Along with the recent advance of high pixel density of image-taking devices, such as digital and video cameras, and miniaturization of optical apparatuses, a smaller and higher performance lens system has been required as a shooting lens for use with them.

In addition, the video camera has been required to record static images with high image quality and to use a high performance and compact lens system.

In general, the enhanced refractive power in each lens unit in the zoom lens would result in a higher zoom range and a shorter lens span because each lens unit moves by a shorter distance to obtain the predetermined zoom range.

However, the simply enhanced refractive power in each lens unit would make stricter the manufacturing precision; for example, the shooting performance remarkably deteriorates due to a relative axial shift among lenses in the third lens unit in the above four-unit zoom lens of positive, negative, positive and positive refractive powers.

On the other hand, the rear focus type zoom lens has been required to have smaller aberrational fluctuations during focusing and during high-range zooming.

Moreover, smaller defocus aberrations are required, when vibrations are prevented, in the optical system that prevents vibrations by decentering part of lenses in a shooting system in a direction perpendicular to the optical axis in order to correct blurred images caused when the lens system vibrates.

SUMMARY OF THE INVENTION

Accordingly, it is a primary but exemplified object of the present invention to provide a zoom lens system and an optical apparatus using the same, that are suitable for a shooting system using a photoelectric conversion element such as CCD, compact, and superior in optical performance.

In order to achieve the above object, a zoom lens system of one aspect of the present invention includes, in order from an object side, a first lens unit of positive refractive power that doesn't move along an optical axis for zooming, a second lens unit of negative refractive power that moves along the optical axis for zooming, a third lens unit of positive refractive power that doesn't move along the optical axis for zooming, the third lens unit including, in order from the object side, a first lens subunit of positive refractive power consisting of one or two positive lens element facing to the object side a convex surface of refractive power that is stronger at the object side than an image side, and a second lens subunit including a cemented lens coupling a concave surface of a negative lens element of refractive power that is stronger at the image side than at the object side, with a convex surface of a positive lens element of refractive power that is stronger at the object side than at the image side, and a fourth lens unit of positive refractive power. The zoom lens system prevents the deterioration of the optical performance, when vibrations are prevented and the third lens unit moves in the direction perpendicular to the optical axis. In addition, the cemented lens in the second lens subunit prevents the performance deterioration caused by the relative axial shift in the third lens unit. This configuration in the third lens unit may make the principal point relatively closer to the second lens unit, shorten a distance from the third lens unit to the image plane, and facilitate the miniaturization of the lens span. Moreover, the lens barrel structure may be made simple and strong to the static pressure by the first lens unit not moved for zooming.

A zoom lens system of another aspect of the present invention includes, in order from an object side, a first lens unit of positive refractive power, a second lens unit of negative refractive power that moves along the optical axis for zooming, a third lens unit of positive refractive power including, in order from the object side, a first lens subunit of positive refractive power consisting of one or two positive lens element facing to the object side a convex surface of refractive power that is stronger at the object side than an image side, and a second lens subunit including a cemented lens coupling a concave surface of a negative lens element of refractive power that is stronger at the image side than at the object side, with a convex surface of a positive lens element of refractive power that is stronger at the object side than at the image side, and a fourth lens unit of positive refractive power, wherein a condition $0.09<Dab/f3<0.35$ is satisfied where Dab is a separation between the first lens subunit and the second lens subunit, and f3 is a focal length of the third lens unit. This zoom lens system prevents the deterioration of the optical performance, when vibrations are prevented and the third lens unit moves in the direction perpendicular to the optical axis. In addition, the cemented lens in the second lens subunit prevents the performance deterioration caused by the relative axial shift in the third lens unit. Moreover, this configuration in the third lens unit may make the principal point relatively closer to the second lens unit, shorten a distance from the third lens unit to the image plane, and facilitate the miniaturization of the lens span.

A zoom lens system of still another aspect of the present invention includes, in order from an object side, a first lens unit of positive refractive power, a second lens unit of negative refractive power that moves along the optical axis for zooming, a third lens unit of positive refractive power including, in order from the object side, a first lens subunit of positive refractive power consisting of one or two positive lens element facing to the object side a convex surface of refractive power that is stronger at the object side than an image side, and a second lens subunit including a cemented lens coupling a concave surface of a negative lens element of refractive power stronger at the image side, with a convex surface of a positive lens element of refractive power stronger at the object side, and a fourth lens unit of positive refractive power, wherein a condition $1.67<3G1n<1.89$ is satisfied where 3G1 is one of positive lens element with an aspherical surface among the first lens subunit, and 3G1n is a refractive index of a material of the positive lens element assigned to 3G1. The zoom lens system prevents the deterioration of the optical performance, when vibrations are prevented and the third lens unit moves in the direction perpendicular to the optical axis. This configuration in the third lens unit may make the principal point relatively closer to the second lens unit, shorten a distance from the third lens unit to the image plane, and facilitate the miniaturization of the lens span.

A zoom lens system of still another aspect of the present invention includes, in order from an object side, a first lens unit of positive refractive power, a second lens unit of negative refractive power that moves along the optical axis for zooming, the second lens unit including, in order from the object side, a first negative lens element, a second negative lens element, a third positive lens element, and fourth negative lens element, a third lens unit of positive refractive power, and a fourth lens unit of positive refractive power, wherein conditions $0.81<2G1f/f2<1.25$, $20.5<2Glv<37.5$, and $0.21<2G1f/2G2f<0.81$ are satisfied where 2G1f is a focal length of the first negative lens element, 2G2f is a focal length of the second negative lens element, f2 is a focal length of the second lens unit, 2Glv is Abbe number of a material of the first negative lens element. In this zoom lens system, the third lens unit may include, in order from the object side, a first lens subunit of positive refractive power consisting of one or two positive lens element facing to the object side a convex surface of refractive power that is stronger at the object side than an image side, and a second lens subunit including a cemented lens coupling a concave surface of a negative lens element of refractive power that is stronger at the image side than at the object side, and a convex surface of a positive lens element of refractive power that is stronger at the object side than at the image side. According to this zoom lens system, the configuration in the second lens unit reduces aberrational fluctuations along with zooming and maintains the high optical performance throughout the entire zoom range.

Any one of the above zoom lens systems preferably satisfies a condition $0.51<f3/f4<1.25$ where f3 and f4 are focal lengths of the third and fourth lens units, respectively. The image is preferably displaced by moving the third lens unit so as to have a component of a direction perpendicular to an optical axis. The fourth lens unit preferably moves along the optical axis for zooming. The zoom lens system is preferably an optical system for forming images on a photoelectric conversion element.

Any one of the above zoom lens systems preferably satisfies a condition $0.34<(3G3R2+3G3R1)/(3G3R2-3G3R1)<1.34$ where 3G3R1 and 3G3R2, respectively, are paraxial radiuses of curvature of surfaces at the object and image sides of the positive lens element that constitutes the cemented lens of the second lens subunit. A condition $0.09<Dab/f3<0.35$ is preferably satisfied where Dab is a separation between the first lens subunit and the second lens subunit, and f3 is a focal length of the third lens unit. A condition $-0.25<3af/3bf<0.35$ is preferably satisfied where 3af and 3bf are focal lengths of the first and second lens units, respectively.

A zoom lens system of still another aspect of the present invention includes, in order from an object side, a first lens unit of positive refractive power, a second lens unit of negative refractive power that moves along the optical axis for zooming, a third lens unit of positive refractive power including, in order from the object side, a first lens subunit of positive refractive power consisting of one or two positive lens element facing to the object side a convex surface of refractive power, and a second lens subunit including a cemented lens coupling with a negative lens element facing a concave surface thereof to the image side, with a positive lens element facing a convex surface thereof to the object side, and a fourth lens unit of positive refractive power, wherein conditions $0.09<Dab/f3<0.35$, $0.51<f3/f4<1.25$, $0.34<(3G3R2+3G3R1)/(3G3R2-3G3R1)<1.34$, and $-0.25<3af/3bf<0.35$ are satisfied where Dab is a separation between the first lens subunit and the object side of the second lens subunit, fi is a focal length of the i-th lens unit, 3af and 3bf are focal lengths of the first and second lens subunits, respectively, and 3G3R1 and 3G3R2, respectively, are paraxial radiuses of curvature on surfaces at the object and image sides of the positive lens element that constitutes the cemented lens of the second lens subunit. This zoom lens system may also achieve operations similar to the above zoom lens systems.

This zoom lens system preferably satisfies a condition $1.67<3G1n<1.89$ where 3G1 is preferably one of positive lens element with an aspherical surface facing a concave surface to the object side among the first lens subunit, and 3G1n is a refractive index of a material of the positive lens element assigned to 3G1. The second lens unit in this zoom lens system preferably includes, in order from the object side, a first negative lens element, a second negative lens element, a third positive lens element, and fourth negative lens element, and wherein conditions $0.81<2G1f/f2<1.25$, $20.5<2Glv<37.5$, and $0.21<2G1f/2G2f<0.81$ are preferably satisfied where 2G1f is a focal length of the first negative lens element in the second lens unit, 2G2f is a focal length of the second negative lens element in the second lens unit, f2 is a focal length of the second lens unit, 2Glv is Abbe number of a material of the first negative lens element in the second lens unit. In this zoom lens system, the fourth lens unit preferably moves along the optical axis for zooming. In addition, in this zoom lens system, the image is preferably displaced by moving the third lens unit so as to have a component of a direction perpendicular to an optical axis. In this zoom lens system, the system is preferably an optical system for forming an image on a photoelectric conversion element.

A zoom lens system of still another aspect of the present invention includes, in order from an object side, a first lens unit of positive refractive power that doesn't move along an optical axis for zooming, a second lens unit of negative refractive power that moves along the optical axis for zooming, a third lens unit of positive refractive power including, in order from the object side, a first lens subunit of positive refractive power having a positive lens element facing a convex surface thereof to the object side, a stop, and a second lens subunit including a cemented lens coupling a negative lens element facing a concave surface thereof to the image side, with a positive lens element facing a convex surface thereof to the object side, and a fourth lens unit of positive refractive power.

A zoom lens system of still another aspect of the present invention includes, in order from an object side, a first lens unit of positive refractive power, a second lens unit of negative refractive power, a third lens unit of positive refractive power including, in order from the object side, a first lens subunit of positive refractive power having a positive lens element facing a convex surface thereof to the object side, a stop, and a second lens subunit including a cemented lens coupling a negative lens element facing a concave surface thereof to the image side, with a positive lens element facing a convex surface thereof to the object side, and a fourth lens unit of positive refractive power, wherein a condition $0.08<Dab/f3<0.64$ is satisfied where Dab is a separation between the first and second lens subunits, and f3 is a focal length of the third lens unit.

A zoom lens system of still another aspect of the present invention includes, in order from an object side, a first lens unit of positive refractive power, a second lens unit of negative refractive power, a third lens unit of positive refractive power including, in order from the object side, a first positive lens element having an aspherical surface facing a convex surface thereof to the object side, a stop, and a negative lens element facing a concave surface thereof to the image side, and a second positive lens element facing a convex surface thereof to the object side, and a fourth lens unit of positive refractive power, wherein a condition $1.67<3G1n<1.89$ is satisfied where 3G1n is a refractive index of a material of the first positive lens element in the third lens unit.

The aforementioned zoom lens systems may make smaller a separation between the second and third lens units that becomes the shortest at the longest focal length end in the entire system (i.e., the telephoto end) than the four-unit zoom lens in which the stop is located just in front of the third lens unit, thus improving the zoom efficiency and making small the lens span. The stop located between the first and second lens units may prevent the deterioration in the optical performance caused by the relative axial shift between the first and second lens units in the third lens unit. This configuration in the third lens unit may make the principal point relatively closer to the second lens unit, shorten a distance from the third lens unit to the image plane, and facilitate the miniaturization of the lens span.

Any one of the above three zoom lens systems preferably satisfies a condition $0.71<f3/f4<1.41$ where f3 and f4 are focal lengths of the third and fourth lens units, respectively. The second lens unit preferably has an aspherical surface. The fourth lens unit preferably moves along the optical axis for zooming. A condition $0.64<(3G3R2+3G3R1)/(3G3R2-3G3R1)<1.64$ is preferably satisfied where 3G3R1 and 3G3R2, respectively, are paraxial radiuses of curvature on surfaces at the object and image sides of the positive lens element that constitutes the cemented lens of the second lens subunit. In this zoom lens system, the system is preferably an optical system for forming an image on a photoelectric conversion element.

Any one of the above three zoom lens systems also preferably satisfies a condition $-0.81<3af/3bf<0.35$ where 3af and 3bf are focal lengths of the first and second lens units, respectively. Any one of the above three zoom lens systems also preferably satisfies a condition $0.01<(D12w+D23t)/BD2<0.84$ where D12w is a separation between the first and second lens units when said zoom lens system has the shortest focal length, D23t is a separation between said second and third lens units when said zoom lens system has the shortest focal length, and BD2 is a separation between a surface closest to the object side and a surface closest to the image side in said second lens unit. Any one of the above three zoom lens systems also preferably satisfies a condition $0.08<Dab/f3<0.64$ where Dab is a separation between the first positive lens element and the second negative lens element, and f3 is a focal length of the third lens unit.

An optical apparatus of still another aspect of the present invention includes the aforementioned zoom lens system and a photoelectric conversion element for receiving an image formed by the zoom lens system.

Other objects and further features of the present invention will become readily apparent from the following description of preferred embodiments with reference to accompanying drawings.

DETAILED DESCRIPTION OF THE PREFERRED EMBODIMENTS

Figure 1:
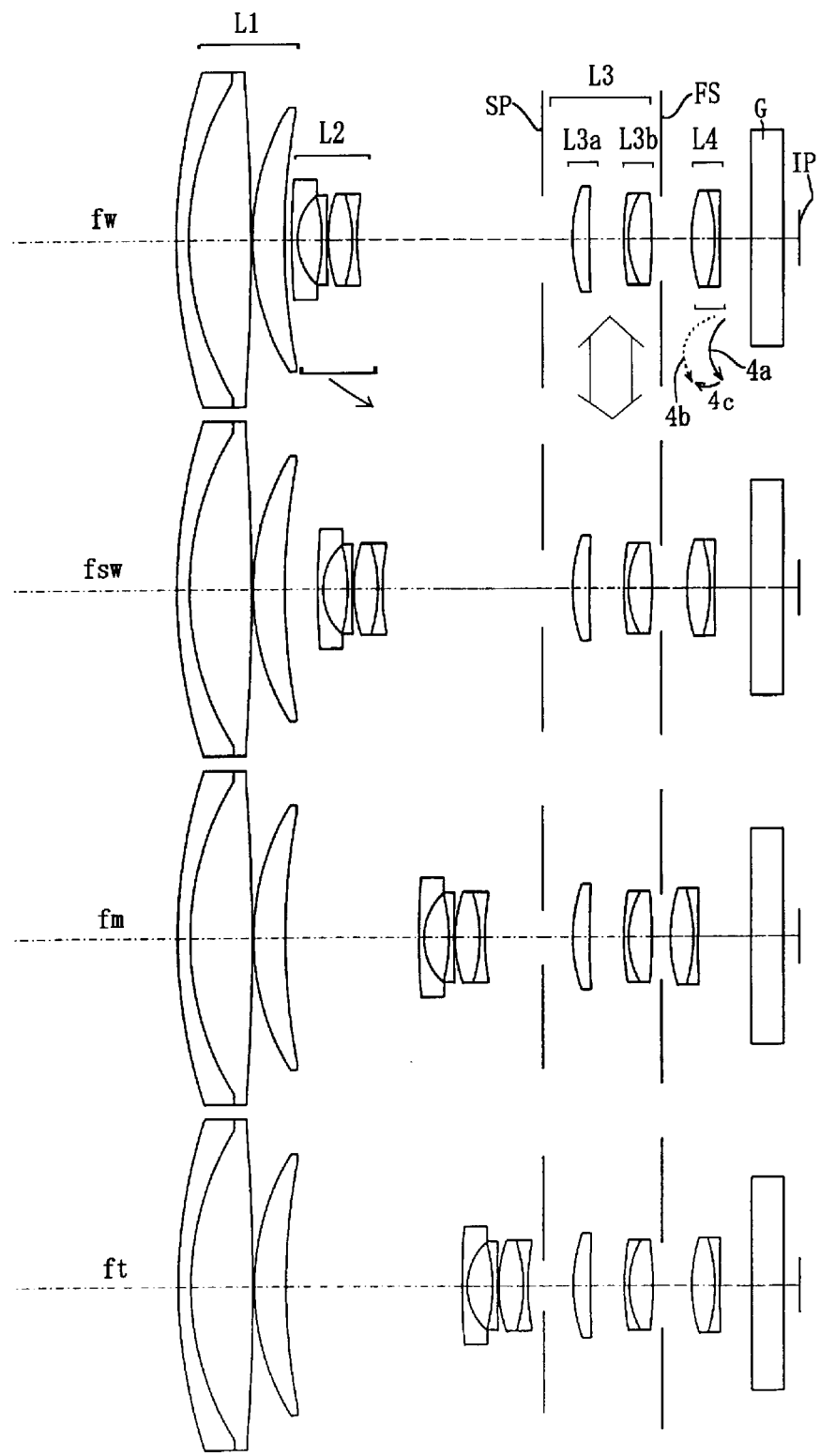
FIG. 1 shows optical sectional views of numerical example 1.
Figure 2:
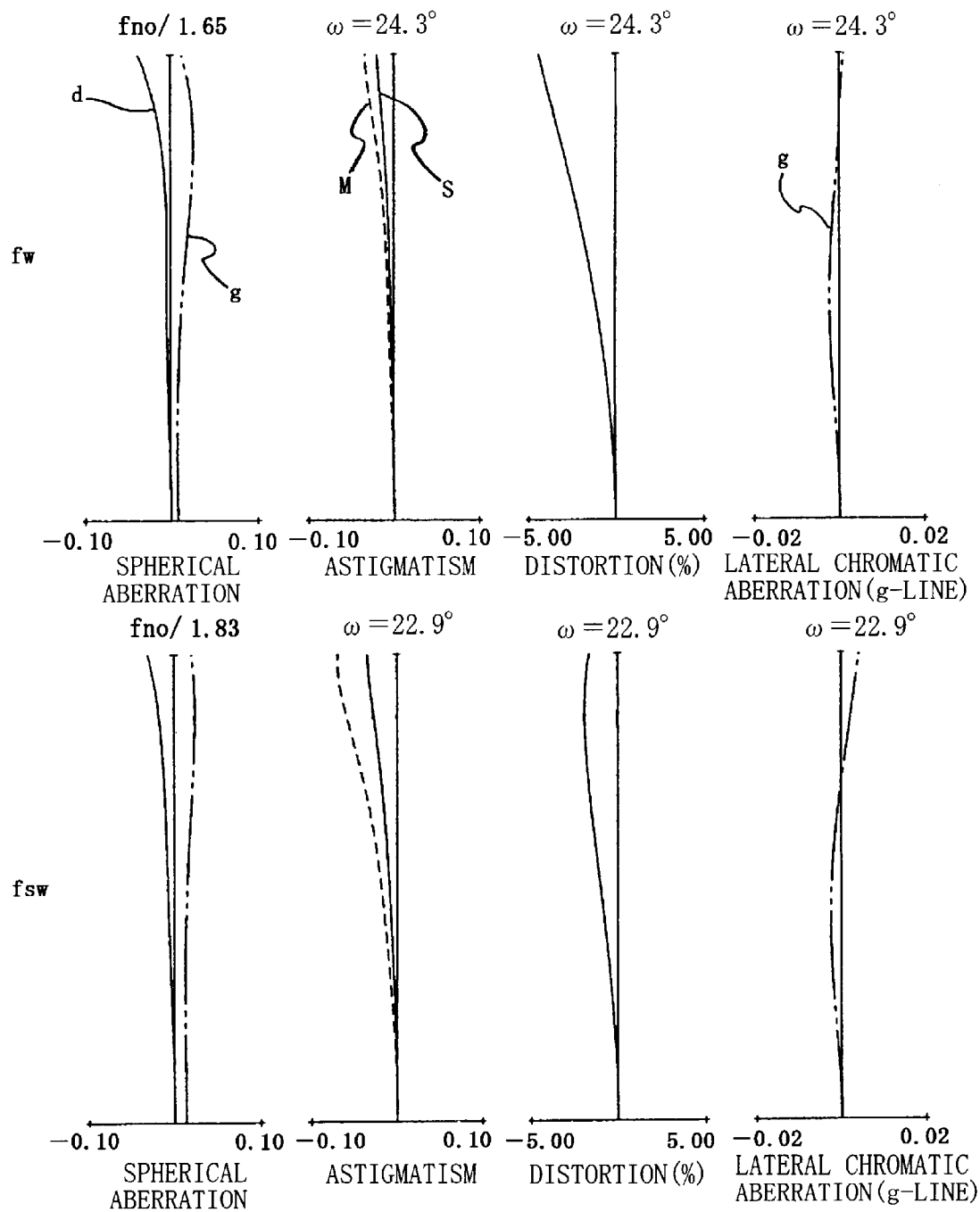
FIG. 2 shows graphic representations of aberrations of the numerical example 1, showing the dynamic image recording time with a focal length fw of the entire lens system and the static image recording time with a focal length fsw of the entire lens system.
Figure 3:
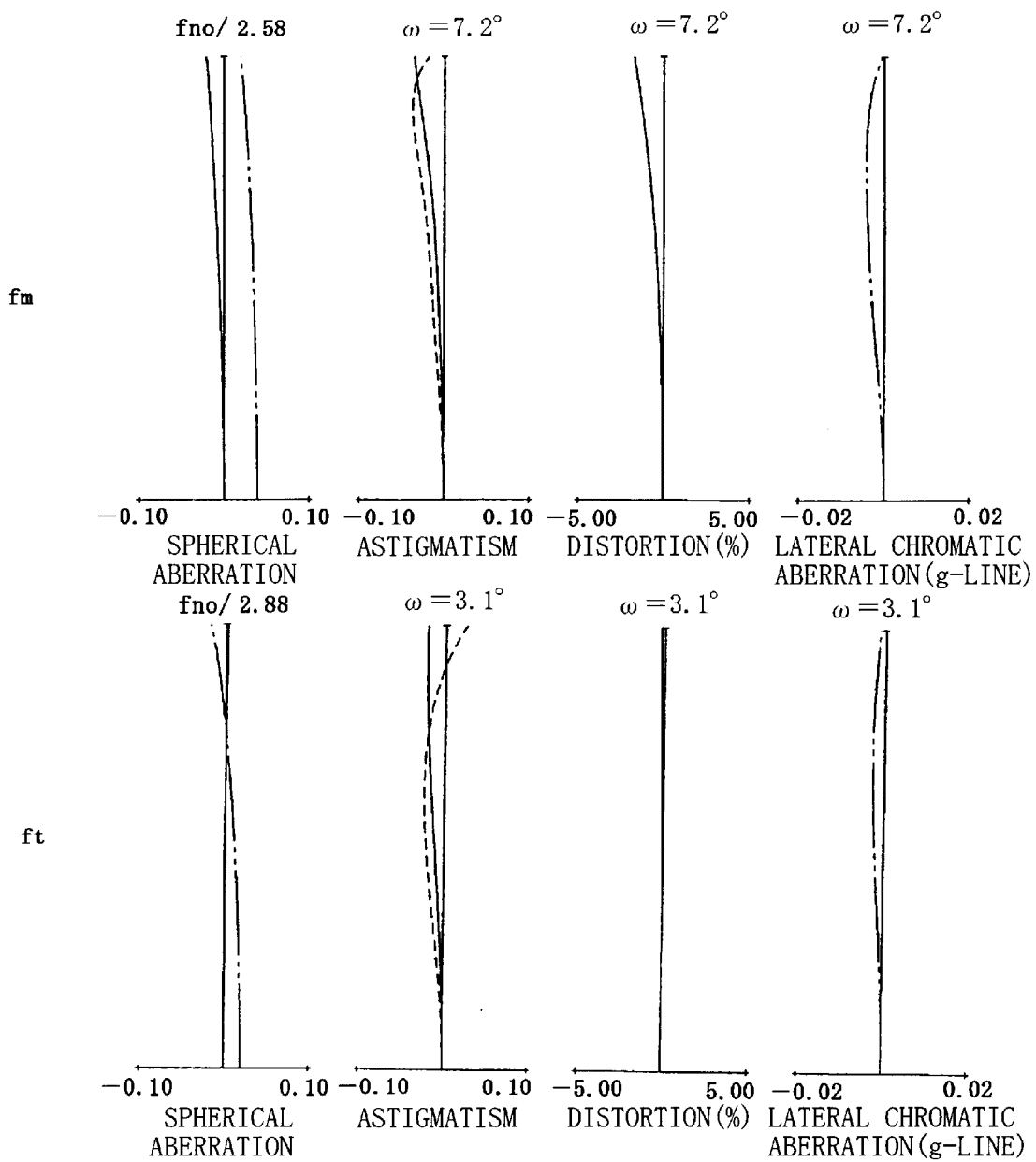
FIG. 3 shows graphic representations of aberrations of the numerical example 1, showing the static image recording time with a focal length fin of the entire lens system and the static image recording time with a focal length ft of the entire lens system.

FIGS. 1, 2 and 3 show sectional views, and graphic representations of aberrations of a zoom lens system of numerical example 1 among embodiments of the present invention.

Figure 4:
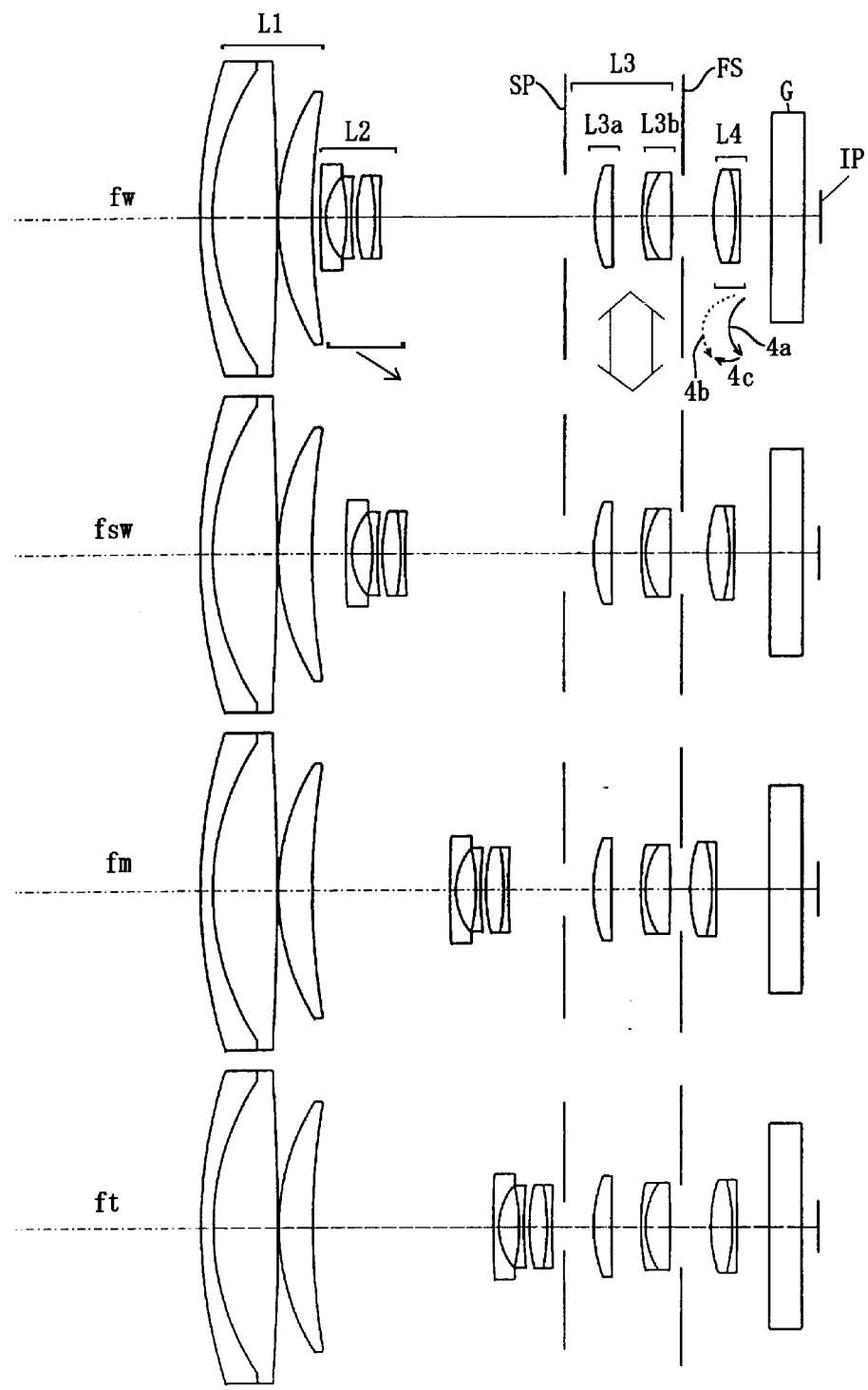
FIG. 4 shows optical sectional views of numerical example 2.
Figure 5:
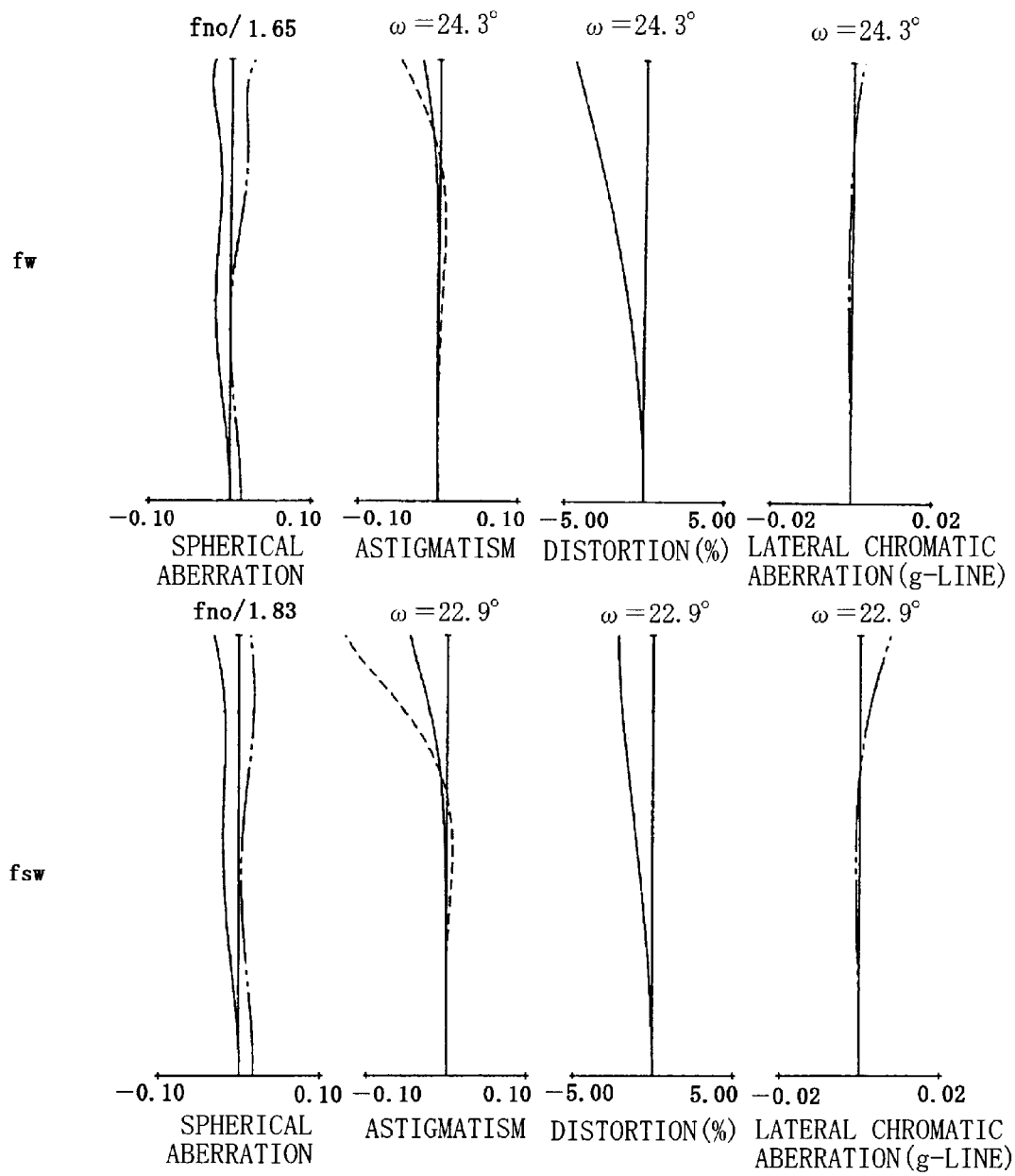
FIG. 5 shows graphic representations of aberrations of the numerical example 2, showing the dynamic image recording time with a focal length fw of the entire lens system and the static image recording time with a focal length fsw of the entire lens system.
Figure 6:
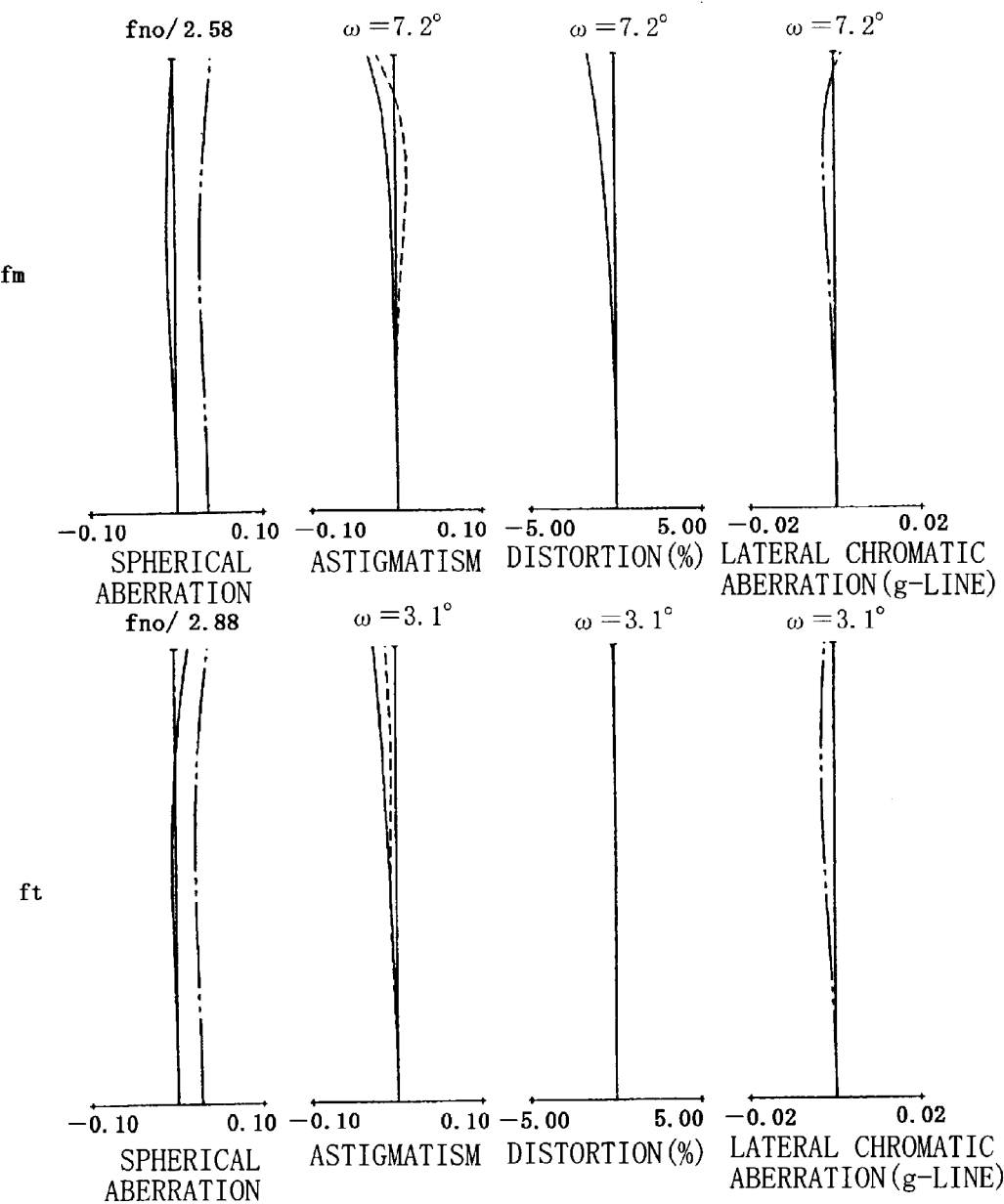
FIG. 6 shows graphic representations of aberrations of the numerical example 2, showing the static image recording time with a focal length fin of the entire lens system and the static image recording time with a focal length ft of the entire lens system.

FIGS. 4, 5 and 6 show sectional views, and graphic representations of aberrations of a zoom lens system of numerical example 2 among embodiments of the present invention.

Figure 7:
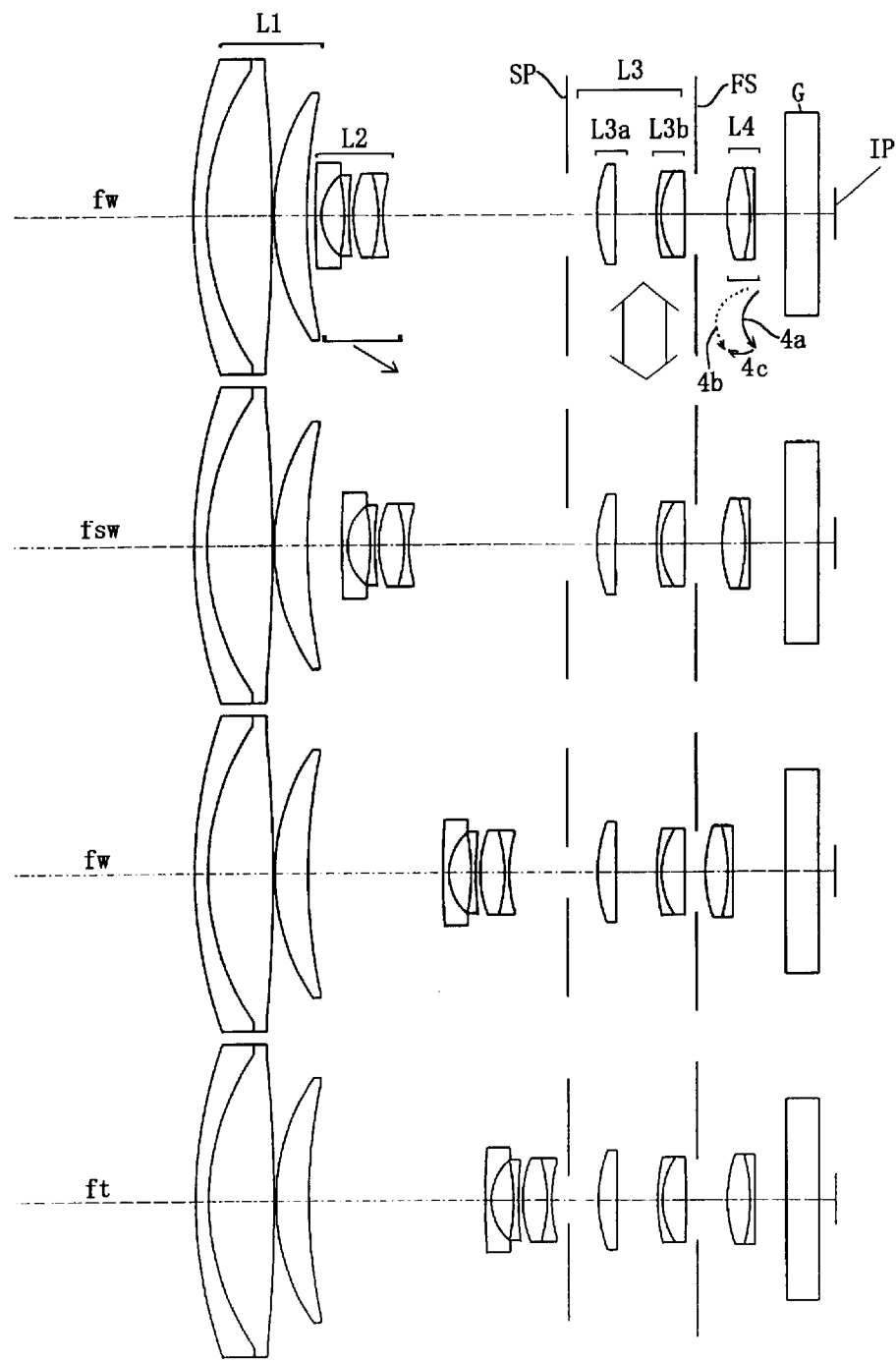
FIG. 7 shows optical sectional views of numerical example 3.
Figure 8:
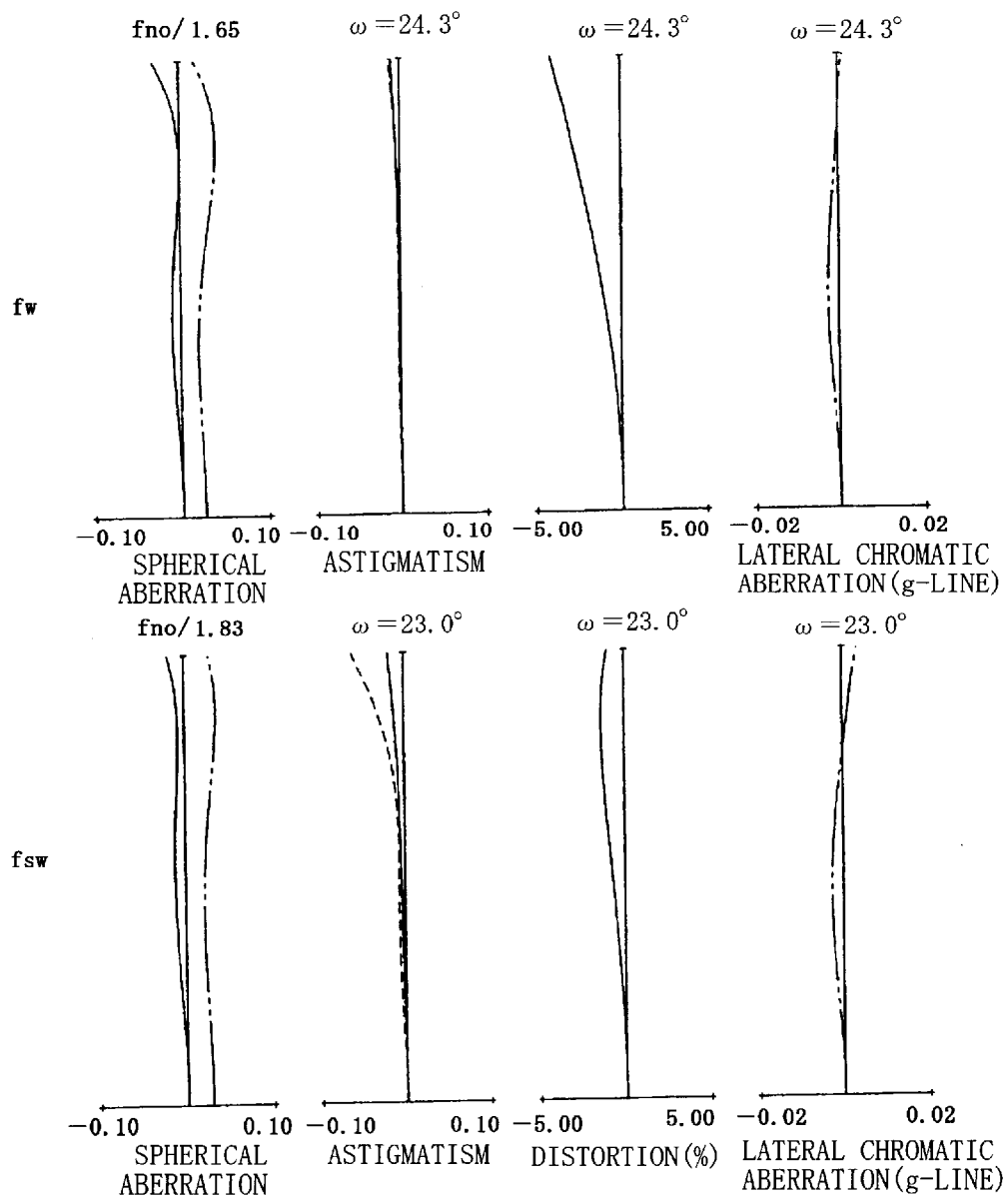
FIG. 8 shows graphic representations of aberrations of the numerical example 3, showing the dynamic image recording time with a focal length fw of the entire lens system and the static image recording time with a focal length fsw of the entire lens system.
Figure 9:
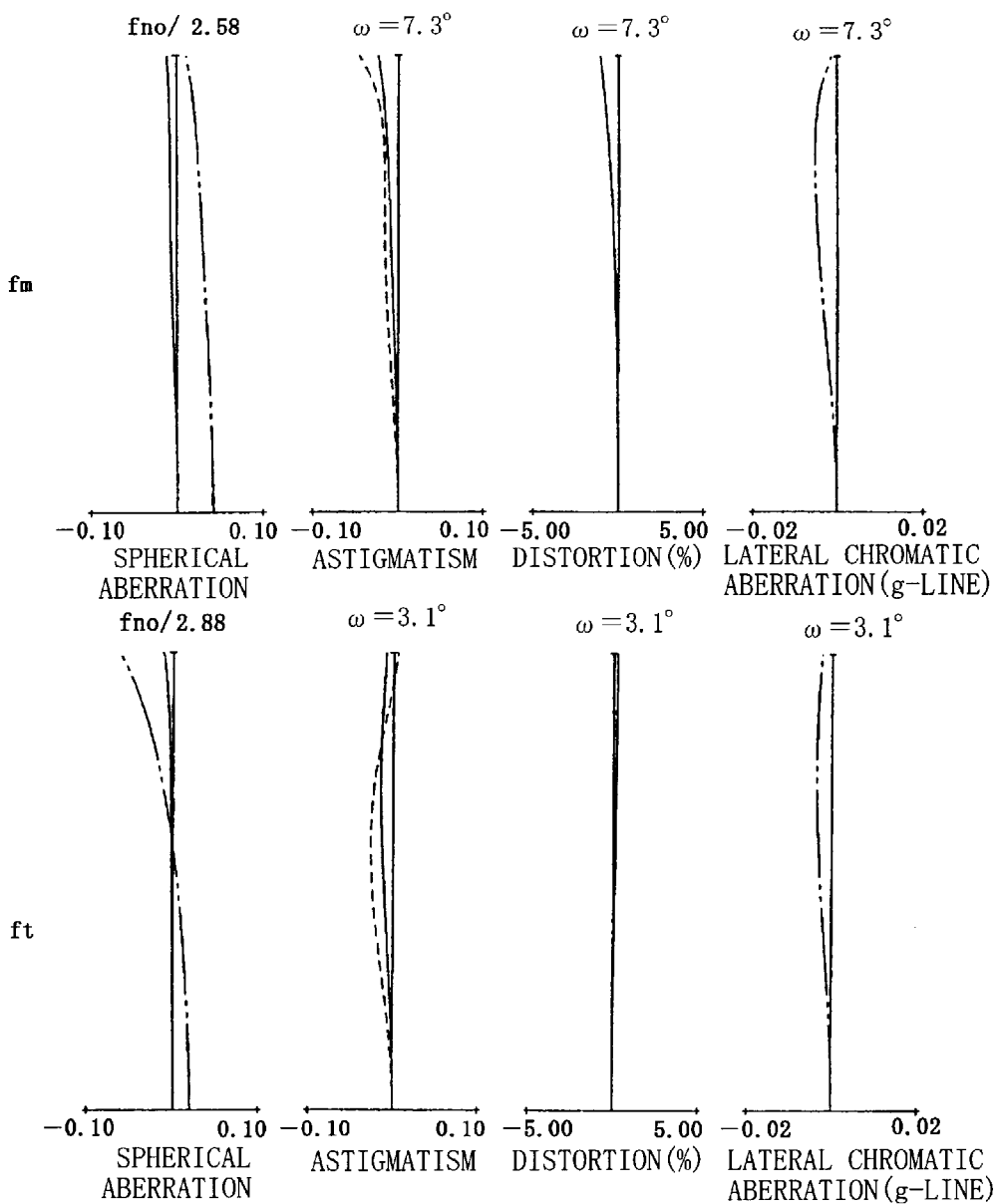
FIG. 9 shows graphic representations of aberrations of the numerical example 3, showing the static image recording time with a focal length fin of the entire lens system and the static image recording time with a focal length ft of the entire lens system.

FIGS. 7, 8 and 9 show sectional views, and graphic representations of aberrations of a zoom lens system of numerical example 3 among embodiments of the present invention.

Figure 10:
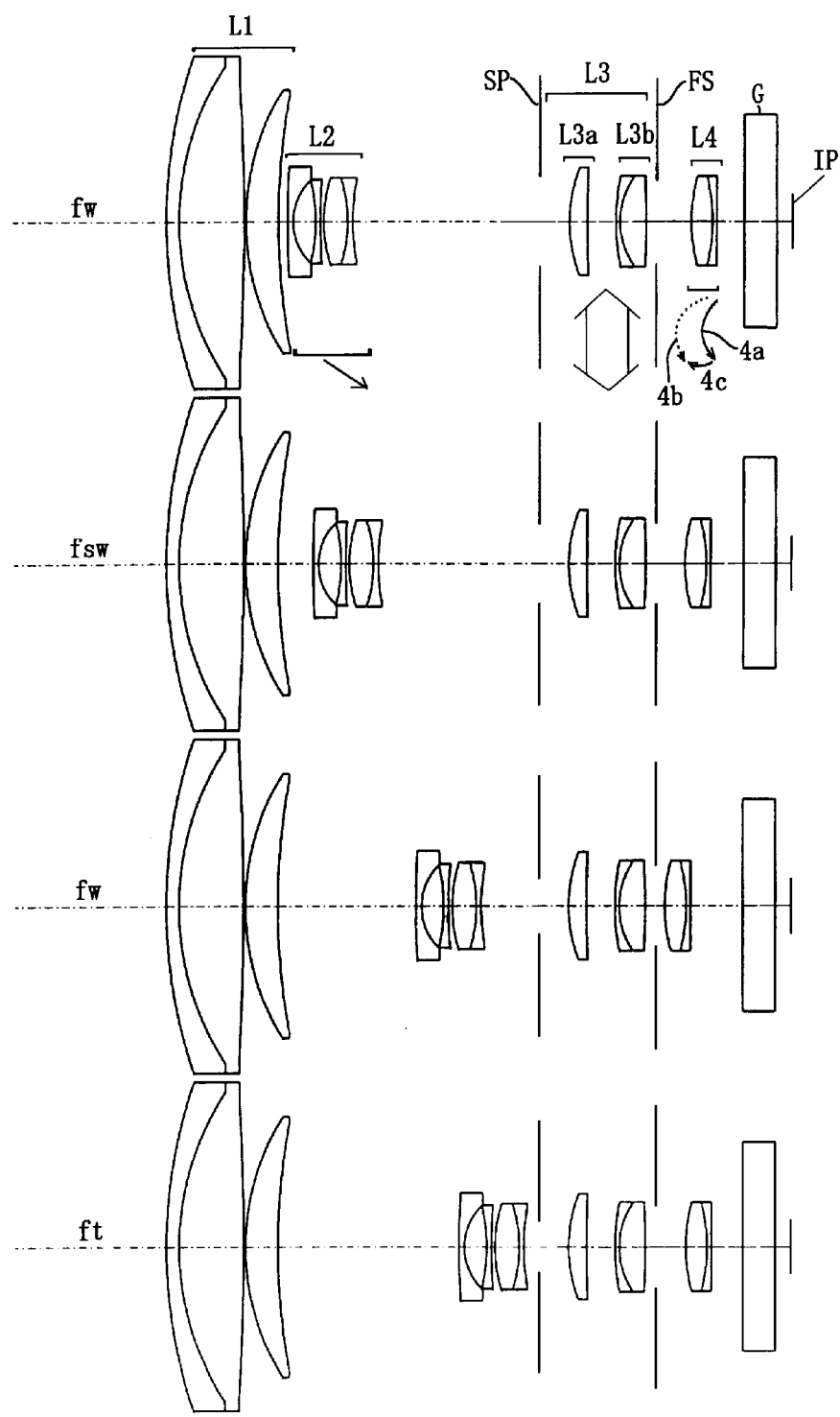
FIG. 10 shows optical sectional views of numerical example 4.
Figure 11:
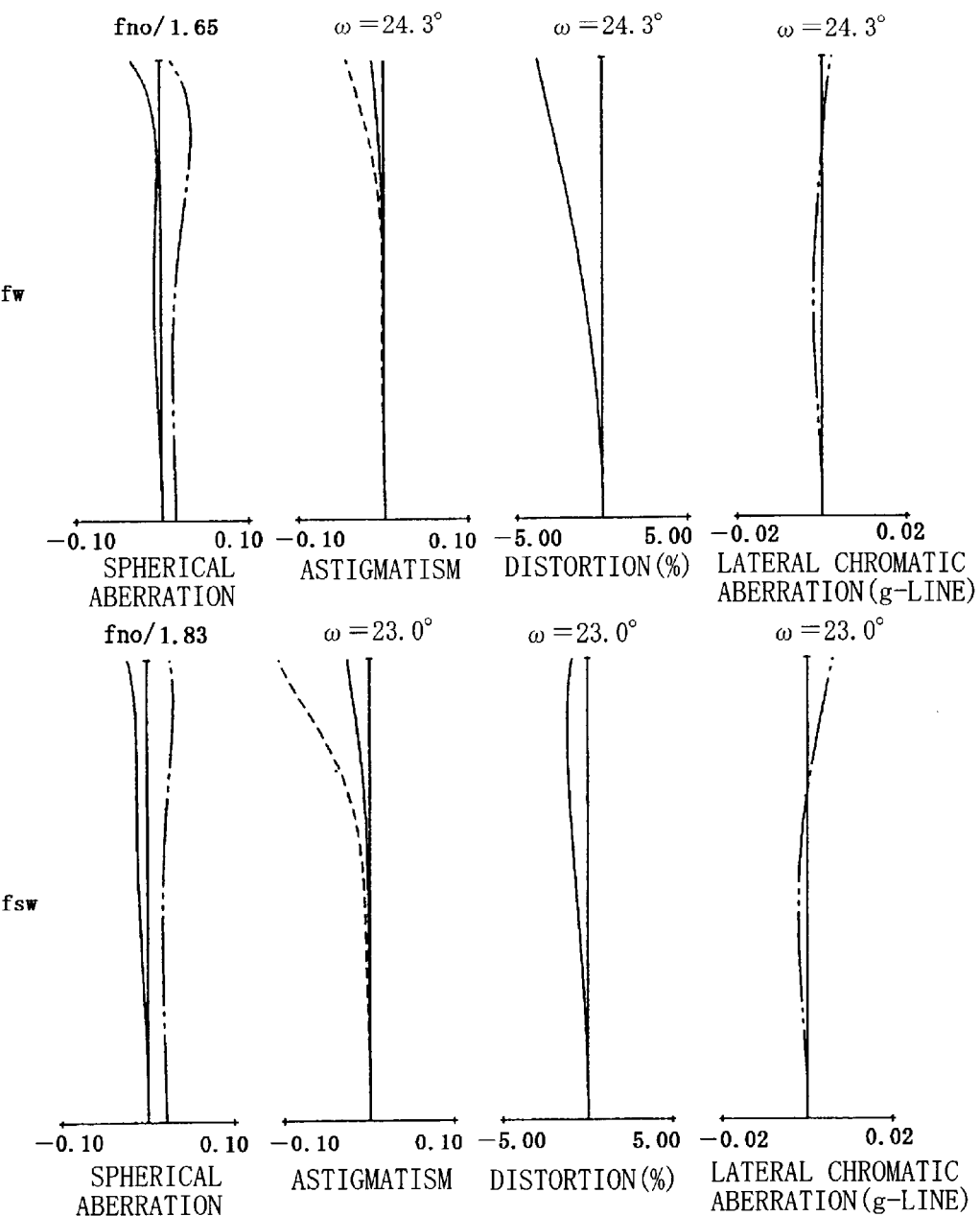
FIG. 11 shows graphic representations of aberrations of the numerical example 4, showing the dynamic image recording time with a focal length fw of the entire lens system and the static image recording time with a focal length fsw of the entire lens system.
Figure 12:
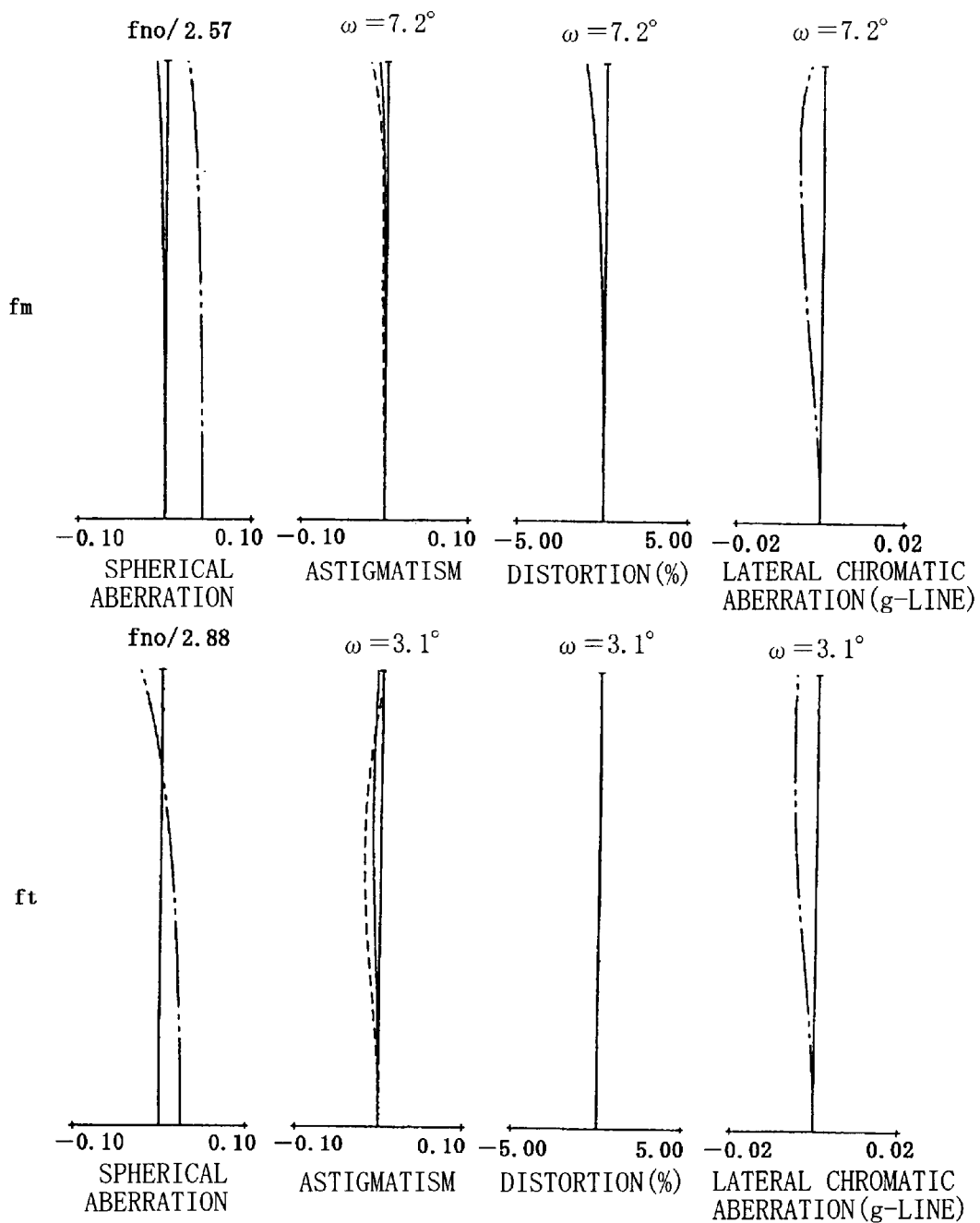
FIG. 12 shows graphic representations of aberrations of the numerical example 4, showing the static image recording time with a focal length fin of the entire lens system and the static image recording time with a focal length ft of the entire lens system.

FIGS. 10, 11 and 12 show sectional views, and graphic representations of aberrations of a zoom lens system of numerical example 3 among embodiments of the present invention.

In the sectional views, L1 is a first unit of positive refractive power ("first lens unit"), L2 is a second unit of negative refractive power ("second lens unit"), L3 is a third unit of positive refractive power ("third lens unit") and has two or more lens subunits including lens subunit L3a ("first lens subunit") of positive refractive power and lens subunit L3b ("second lens subunit") of positive refractive power or negative refractive power.

The instant embodiment moves, as shown by arrow, the third unit L3 in a direction perpendicular to the optical axis and corrects blurs in shot images when the zoom optical system vibrates (or inclines). An image is shifted by moving the third unit L3 in a direction that has a component perpendicular to the optical axis, which is not necessarily a direction perpendicular to the optical axis.

L4 is a fourth unit of positive refractive power ("fourth lens unit"). SP is an aperture stop and located in front of or in the middle of the third unit L3. G is a glass block, such as a face plate. IP is an image plane, at which an image-taking device, ("a photoelectric element") such as a CCD and MOS, is located.

FS is a flare stop that is located at the side of the image plane of the third unit, and cuts flare light around a screen at a wide-angle end.

This embodiment may removably insert an ND filter between the aperture stop SP and the third unit L3 so as to adjust an amount of light incident to the image plane IP.

The instant embodiment moves the second and fourth units along with zooming. The movement of the second unit serves primarily as the magnification variation operation; the movement of the fourth unit serves to correct fluctuations of the image plane along with the magnification variation.

The instant embodiment adopts a rear focus method that moves the fourth unit for focusing. As illustrated, a real curve 4a and dotted curve 4b of the fourth unit indicate, when the system focuses to the infinite distant object and the closest object, respectively, moving paths to correct fluctuations of the image plane along with zooming from the wide-angle end to the telephoto end. The fourth unit is moved so that it draws a convex-shaped path to the object side during zooming from the wide-angle end to the telephoto end. Thereby, a space between the third and fourth units is maximized and the lens span is effectively shortened.

The instant embodiment feeds the fourth unit forward, as shown by a line 4c in FIG. 1, for example, when attempting to focus from the infinite distant object to the closest object at the telephoto end.

The first and third units don't move for zooming and focusing.

In applying the inventive zoom lens system to an optical apparatus, such as video and digital cameras, any numerical example uses a photoelectric conversion element, such as a CCD and a CMOS having a cell pitch of 3 $\mu$m for a photoelectric conversion element at the image plane. Then, it sets an image size to be a diameter of $\phi$3.9 (mm) and makes the entire zoom range available with the focal length from fw to ft during the dynamic image recording time, while it sets an image size to be a diameter of $\phi$5.1 and makes the zoom range available with the focal length from fsw to ft during the still picture recording time.

The focal lengths fw, fsw, and ft are indicated in the numerical examples, which will be described later.

During the dynamic image recording time, the image size of $\phi$3.9 may be cut out and recorded from the image size that is larger than $\phi$3.9, so as to prevent vibrations electronically. The aperture stop diameter becomes the largest with the focal length fw during the dynamic image recording time, and made smaller with the focal length ft both during the static image recording time and during dynamic image recording time.

In comparison with the so-called four-unit zoom lens that feeds the first unit, the instant embodiment adopts the aforementioned rear focus method so as to prevent the performance deterioration caused by the defocus error of the first unit and to effectually keep lower the lens effective diameter in the first unit.

The instant embodiment also reduces aberrational fluctuations caused by the movable lens units by placing the aperture stop just in front of the third unit, and easily reduces a diameter of the front lens by shortening separations in the front lens units before the aperture stop.

The instant embodiment may compose the third unit of three or more lenses. It corrects blurs in an image when the zoom lens system vibrates by moving the third unit in the direction perpendicular to the optical axis for vibration resistant purposes.

(a-1) In one aspect of the present invention, the zoom lens system comprises, in order from the object side, the first lens unit of positive refractive power that doesn't move along the optical axis for zooming, the second lens unit of negative refractive power that moves along the optical axis for zooming, the third lens unit of positive refractive power, and the fourth lens unit of positive refractive power. The third lens unit includes, in order from the object side, the first lens subunit of positive refractive power consisting of one or two positive lens elements facing to the object side a convex surface of refractive power that is stronger at the object side, and the second lens subunit including a cemented lens coupling a negative lens element facing to the object side a concave surface of refractive power that is stronger at the image side, with a positive lens element facing to the object side a convex surface of refractive power that is stronger at the object side. Alternatively, the zoom lens system comprises, in order from the object side, the first lens unit of positive refractive power, the second lens unit of negative refractive power that moves along the optical axis for zooming, the third lens unit of positive refractive power, and the fourth lens unit of positive refractive power that moves along the optical axis for zooming.

In particular, this structure in the third lens unit may prevent the deterioration of the optical performance when vibrations are prevented and the third lens unit moves in the direction perpendicular to the optical axis. The cemented lens in the second lens subunit may prevent the deterioration of the optical performance caused by the relative axial shift in the third lens unit. In addition, this structure in the third lens unit may place the principal point of the third lens unit relatively close to the second lens unit, thereby shortening the distance from the third lens unit to the image plane and easily reducing the lens span.

A fixation of the first unit during zooming easily makes the lens barrel structure simple and strong to the static pressure.

In other aspect of the present invention, the zoom lens system may adopt the following configurations.

(a-2) One configuration is to satisfy a condition:

$$0.09 < Dab/f3 < 0.35 \tag{1}$$

where Dab is a separation between the first lens subunit and the second lens subunit, and f3 is a focal length of the third lens unit.

This configuration in the third lens unit may prevent the deterioration of the optical performance, when vibrations are prevented and the third lens unit moves in the direction perpendicular to the optical axis. In addition, the cemented lens in the second lens subunit may prevent the deterioration of the optical performance caused by the relative axial shift in the third lens unit. This configuration in the third lens unit may make the principal point relatively closer to the second lens unit, shorten a distance from the third lens unit to the image plane, and facilitate the miniaturization of the lens span.

(a-3) Another configuration is to satisfy a condition:

$$1.67 < 3G1n < 1.89 \tag{2}$$

where 3G1 is one of positive lens element with an aspherical surface that faces a convex surface to the object side among the first lens subunit, and 3G1n is a refractive index of a material of the positive lens element (3G1).

This configuration in the third lens unit may prevent, when vibrations are prevented and the third lens unit moves in the direction perpendicular to the optical axis, the deterioration of the optical performance. In addition, this configuration in the third lens unit may make the principal point relatively closer to the second lens unit, shorten a distance from the third lens unit to the image plane, and facilitate the miniaturization of the lens span.

(a-4) Still another configuration is to include in the second lens unit, in order from the object side, a first negative lens element (2G1), a second negative lens element (2G2), a third positive lens element (2G3), and a fourth negative lens element (2G4), and to satisfy conditions:

$$0.81 < 2G1f/f2 < 1.25 \tag{3}$$

$$20.5 < 2G1v < 37.5 \tag{4}$$

$$0.21 < 2G1f/2G2f < 0.81 \tag{5}$$

where 2G1f and 2G2f are focal lengths of the negative lens elements 2G1 and 2G2, f2 is a focal length of the second lens unit, and 2G1v is Abbe number of a material of the negative lens element 2G1.

This configuration in the second lens unit reduces aberrational fluctuations along with zooming, and improves the optical performance throughout the entire zoom range.

It is preferable that the inventive zoom lens configurations (a-1) to (a-4) meet at least one of the following configurations to improve the optical performance.

(b-1) One configuration is to satisfy a condition:

$$0.51 < f3/f4 < 1.25 \tag{6}$$

where fi is a focal length of i-th lens unit.

(b-2) Another configuration is that the third lens unit corrects blurs in a shot image by moving so as to have a component of the direction perpendicular to the optical axis when the zoom lens system vibrates.

(b-3) Still another configuration is that the fourth lens unit corrects fluctuations of the image plane along with zooming and conducts focusing.

(b-4) Another configuration is to satisfy a condition:

$$0.34 < (3G3R2 + 3G3R1)/(3G3R2 - 3G3R1) < 1.34 \tag{7}$$

where 3G3R1 and 3G3R2, respectively, are paraxial radiuses of curvature of surfaces at the object and image sides of the positive lens element that constitutes the cemented lens of the second lens subunit.

(b-5) Still another configuration is to satisfy a condition:

$$0.09 < Dab/f3 < 0.35 \tag{1}$$

where Dab is a separation between the first lens subunit and the second lens subunit, and f3 is the focal length of said third lens unit.

(b-6) Another configuration is to satisfy a condition:

$$-0.25 < 3af/3bf < 0.35 \tag{8}$$

where 3af and 3bf are focal lengths of the first and second lens subunits, respectively.

Further, the present invention may employ the following configuration with the above configuration (a-1).

(c-1) The configuration is to satisfy conditions:

$$0.09 < Dab/f3 < 0.35 \quad (1)$$

$$0.51 < f3/f4 < 1.25 \quad (6)$$

$$0.34 < (3G3R2+3G3R1)/(3G3R2-3G3R1) < 1.34 \quad (7)$$

$$-0.25 < 3af/3bf < 0.35 \quad (8)$$

where Dab is the separation between the first lens subunit and the second lens unit, fi is a focal lengths of i-th lens unit, 3af and 3bf are focal lengths of the first and second lens subunits, respectively, and 3G3R1 and 3G3R2, respectively, are paraxial radiuses of curvature on surfaces at the object and image sides of the positive lens element that constitutes the cemented lens of the second lens subunit.

It is preferable that the present invention adopts at least one of the following configurations with the above configuration (c-1).

(d-1) Another configuration is to satisfy a condition:

$$1.67 < 3G1n < 1.89 \quad (2)$$

where 3G1 is one of positive lens element with an aspherical surface that faces a convex surface to the object side among the first lens subunit, and 3G1n is a refractive index of a material of the positive lens element (3G1).

(d-2) Still another configuration is to include in the second lens unit, in order from the object side, a first negative lens element (2G1), a second negative lens element (2G2), a third positive lens element (2G3), and a fourth negative lens element (2G4), and to satisfy conditions:

$$0.81 < 2G1f/f2 < 1.25 \quad (3)$$

$$20.5 < 2G1v < 37.5 \quad (4)$$

$$0.21 < 2G1f/2G2f < 0.81 \quad (5)$$

where 2G1f and 2G2f are focal lengths of the negative lens element 2G1 and 2G2, f2 is a focal length of said second lens unit, 2G1v is Abbe number of a material of the negative lens 2G1.

Next follows a description of technical meanings of each of the above equations.

The equation (1) relates to a separation between the first lens subunit, and the second lens subunit. When the separation exceeds the upper limit, the entire lens system becomes bulk. The upper limit is set preferably to be 0.31. When the separation exceeds the lower limit, the performance deterioration caused by the relative shaft shift becomes large. The upper limit is set preferably to be 0.13, and more preferably to be 0.17.

The equation (2) relates to the refractive index of the material of the positive lens element 3G1. When the refractive index becomes high enough to exceed the upper limit, the image plane curves from the middle to the maximum image height excessively and the high performance cannot be maintained. The upper limit is set preferably to be 1.85. When the refractive index becomes low enough to exceed the lower limit, the spherical aberration becomes too large at the positive lens element 3G1 to maintain the high performance. The lower limit is set preferably to be 0.72 and more preferably to be 1.77.

The equation (3) relates to a ratio of the focal length of the second lens unit to that of the negative lens element 2G1. When the refractive power of the negative lens element 2G1 becomes weak enough to exceed the upper limit, the lens diameter of the first lens unit becomes large. The upper limit is set preferably to be 1.19, and more preferably to be 1.14. When it exceeds the lower limit, the spherical aberration becomes too large to maintain the high performance. The lower limit is set preferably to be 0.84 and more preferably to be 0.88.

The equation (4) relates to Abbe number of the material of the negative lens element 2G1. When it exceeds the upper limit and lowers the dispersion of the glass material, the cost of the glass material increases. The upper limit is set preferably to be 30.5, and more preferably to be 27.0. When it exceeds the lower limit and enlarges the dispersion of the glass material, it becomes difficult to correct the chromatic aberration. The lower limit is set preferably to be 23.5.

The equation (5) relates to a ratio of the focal length of the negative lens element 2G1 to that of the negative lens element 2G2. When the refractive power of the negative lens element 2G1 becomes weak enough to exceed the upper limit, the lens diameter of the first lens unit becomes large. The upper limit is set preferably to be 0.71. When the refractive power of the negative lens element 2G2 becomes weak enough to exceed the lower limit, it is difficult to correct the coma aberration generated at the negative lens element 2G1 using the negative lens element 2G2 and thus it is difficult to maintain the high performance. The lower limit is set preferably to be 0.27 and more preferably to be 0.33.

The equation (6) relates to a ratio of the focal length of the third lens unit to that of the fourth lens unit. When it exceeds the upper limit, the refractive power of the fourth lens unit becomes too strong, the number of lenses in the fourth lens unit to properly correct aberrations increases and the lens span becomes too long. The upper limit is set preferably to be 1.15, and more preferably to be 1.05. When it exceeds the lower limit, the refractive power of the fourth lens unit becomes too weak, the shift amount to correct the image plane during zooming or the shift amount for focusing becomes too large, and the lens span becomes too long. The lower limit is set preferably to be 0.59 and more preferably to be 0.66.

The equation (7) relates to a shape of the positive lens element to be coupled with the negative lens element in the second lens subunit. When it exceeds the upper limit, the negative refractive power becomes too strong at the lens surface 3GR2, and the spherical aberration becomes disadvantageously large at the plus side. The upper limit is set preferably to be 1.16, and more preferably to be 1.00. When it exceeds the lower limit, the positive refractive power of the lens surface 3GR2 becomes too strong and the spherical aberration becomes too large at the minus side. The lower limit is set preferably to be 0.41 and more preferably to be 0.49.

The equation (8) relates to a ratio of a focal length of the first lens subunit to that of the second lens subunit. When it exceeds the upper limit, the positive refractive power of the first lens subunit becomes weak, the principal point of the third lens unit recedes from the second lens unit, and the lens span cannot be made small. The upper limit is set preferably to be 0.27, and more preferably to be 0.19. When it exceeds the lower limit, the second lens subunit comes to have the negative refractive power, and the negative refractive power becomes sufficiently strong, the spherical aberration becomes disadvantageously large at the plus side. The lower limit is set preferably to be −0.17 and more preferably to be −0.09.

Figure 13:
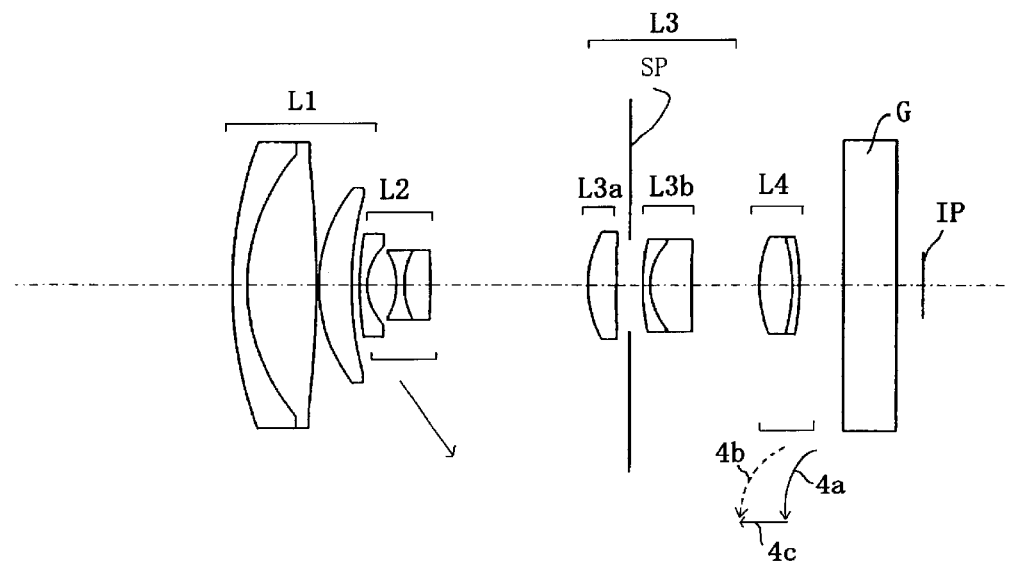
FIG. 13 shows sectional views of lenses of numerical example 5.
Figure 14:
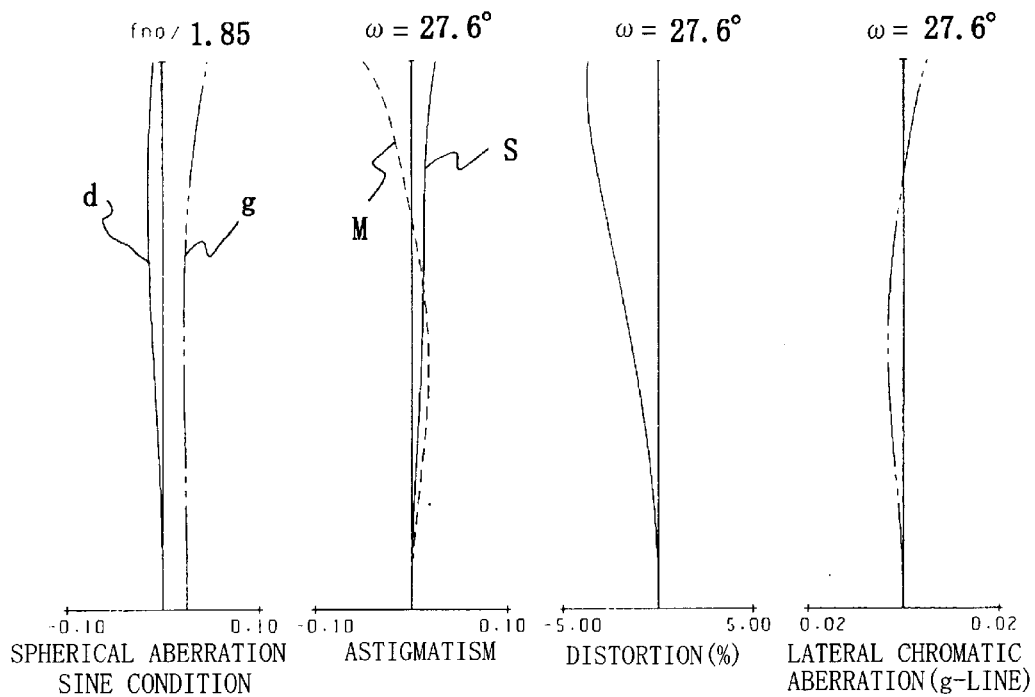
FIG. 14 shows graphic representations of aberrations at a wide-angle end of the numerical example 5.
Figure 15:
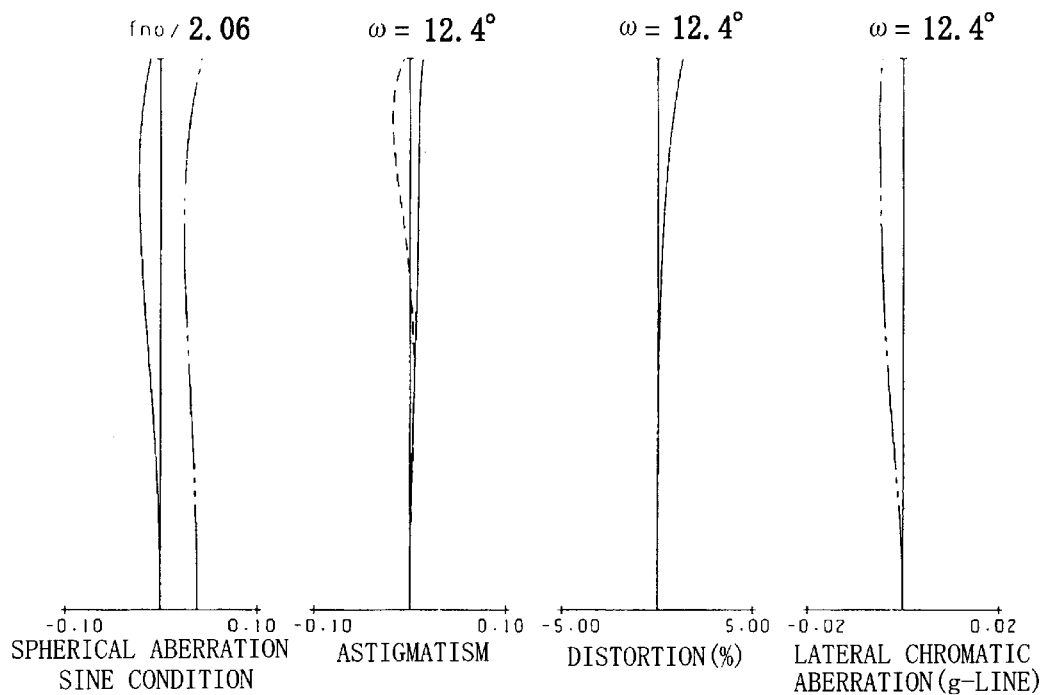
FIG. 15 shows graphic representations of aberrations at a midpoint of the numerical example 5.
Figure 16:
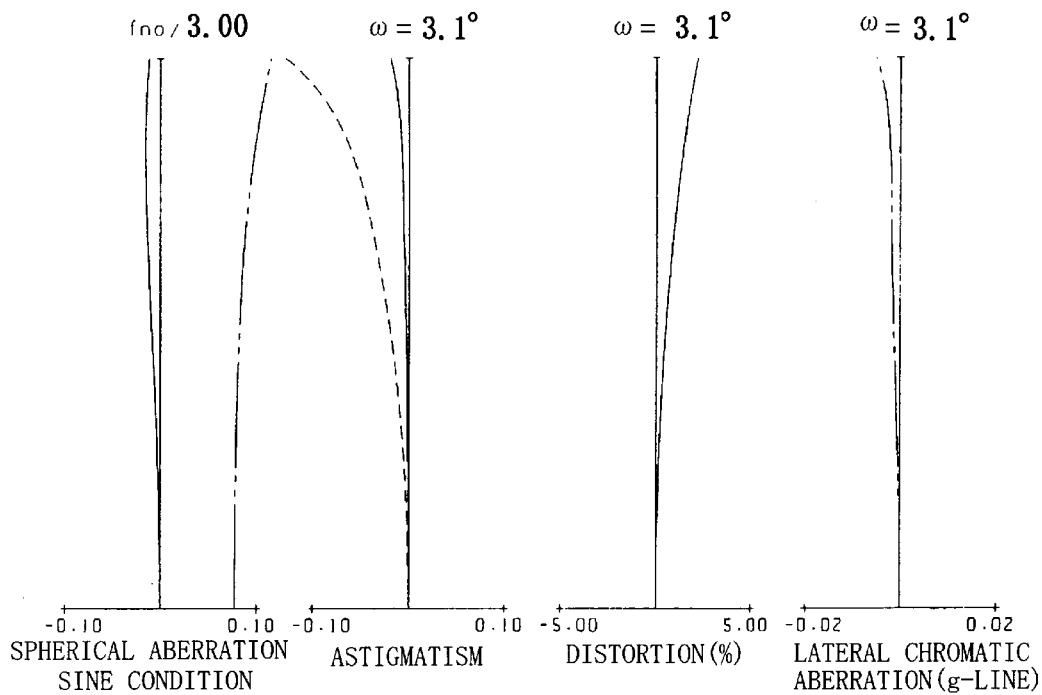
FIG. 16 shows graphic representations of aberrations at a telephoto end of the numerical example 5.

FIG. 13 shows sectional views of essential parts of numerical example 5 of the zoom lens system according to the present invention. FIGS. 14, 15 and 16 respectively show graphic representations of aberrations at a wide-angle end, a midpoint, and a telephoto end of the numerical example 5.

Figure 17:
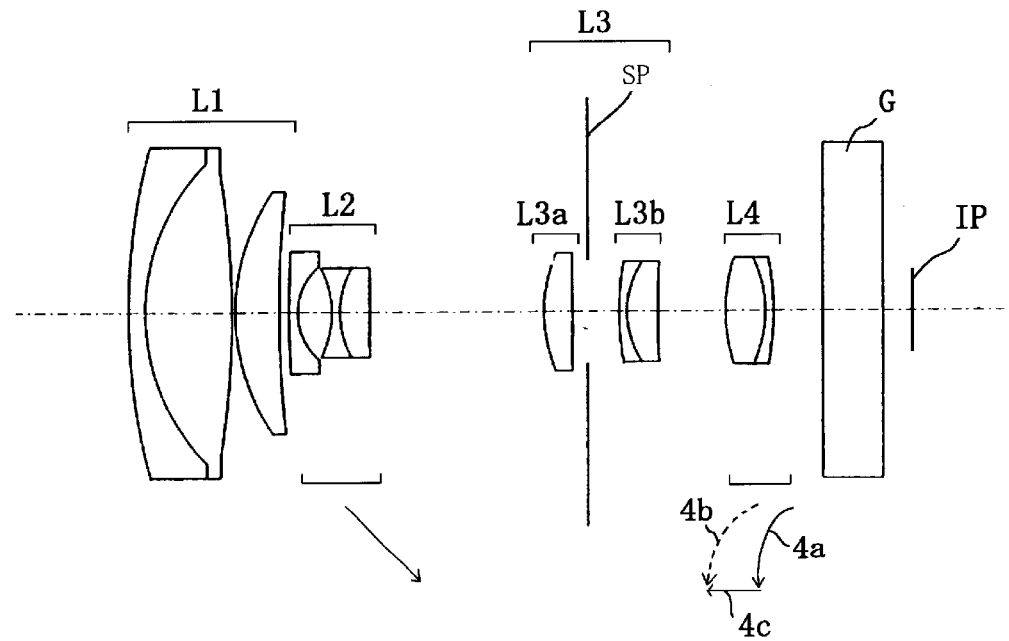
FIG. 17 shows sectional views of lenses numerical example 6.
Figure 18:
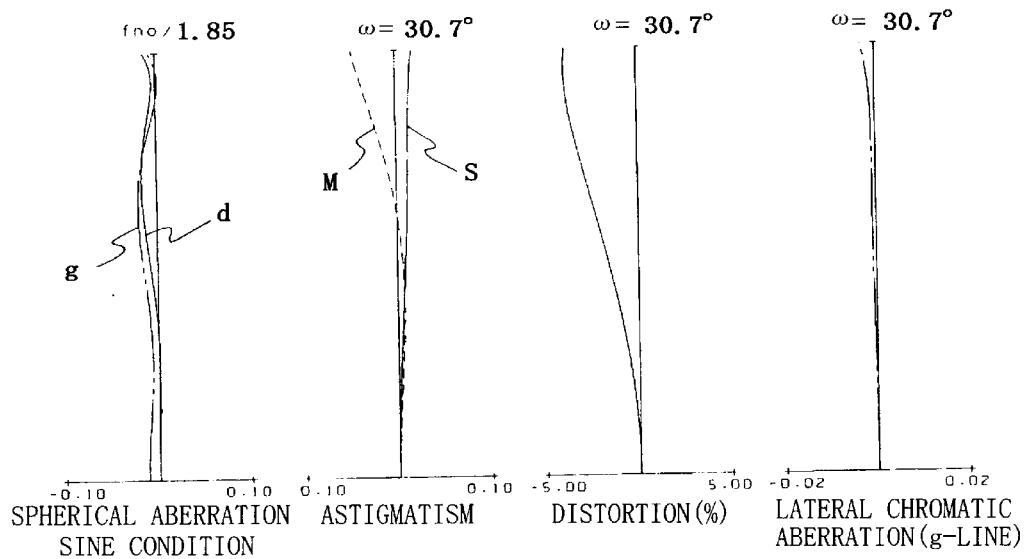
FIG. 18 shows graphic representations of aberrations at a wide-angle end of the numerical example 6.
Figure 19:
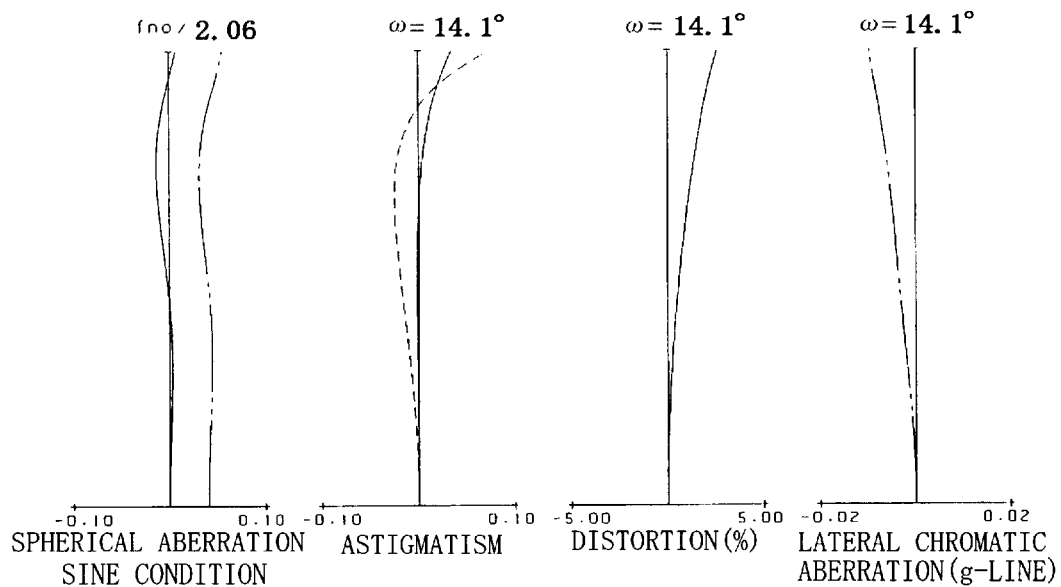
FIG. 19 shows graphic representations of aberrations at a midpoint of the numerical example 6.
Figure 20:
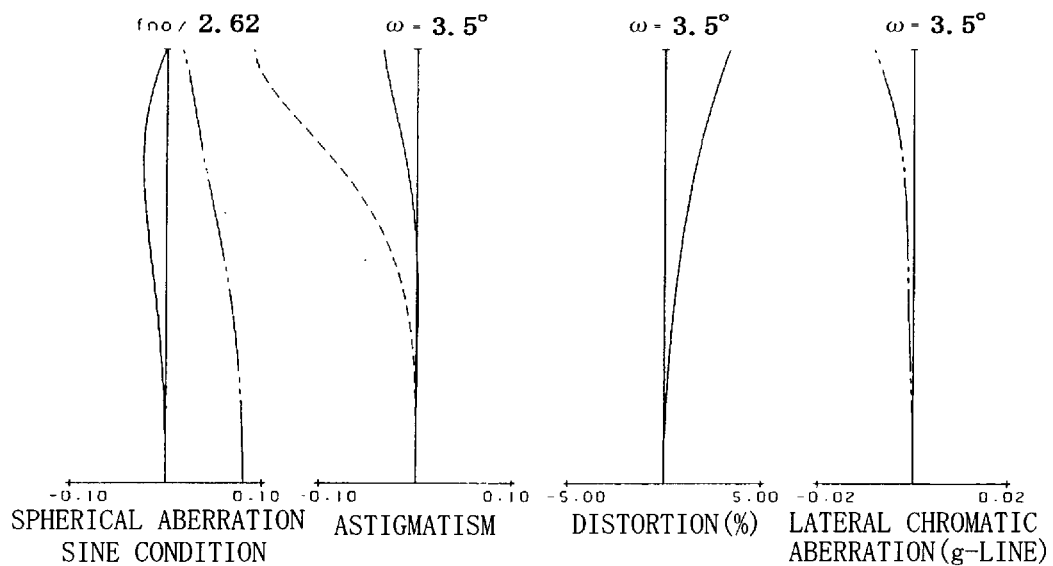
FIG. 20 shows graphic representations of aberrations at a telephoto end of the numerical example 6.

FIG. 17 shows sectional views of essential parts of numerical example 6 of the zoom lens system according to the present invention. FIGS. 18, 19 and 20 respectively show graphic representations of aberrations at a wide-angle end, a midpoint, and a telephoto end of the numerical example 6.

Figure 21:
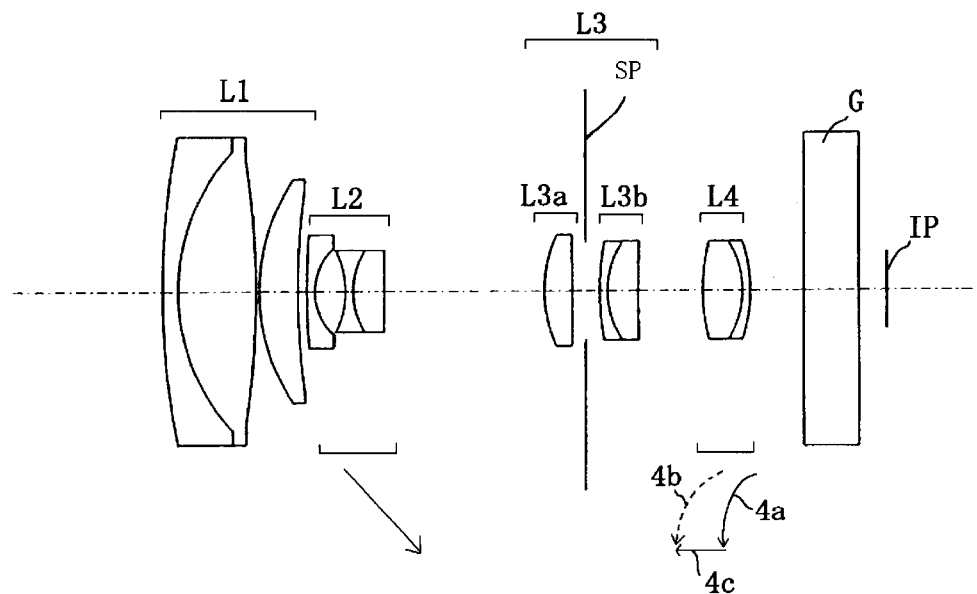
FIG. 21 shows sectional views of lenses numerical example 7.
Figure 22:
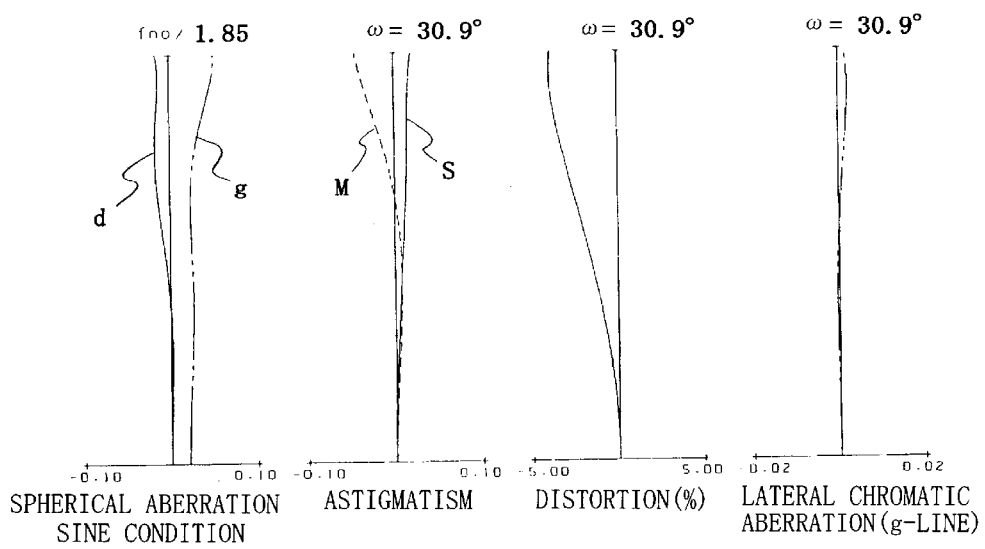
FIG. 22 shows graphic representations of aberrations at a wide-angle end of the numerical example 7.
Figure 23:
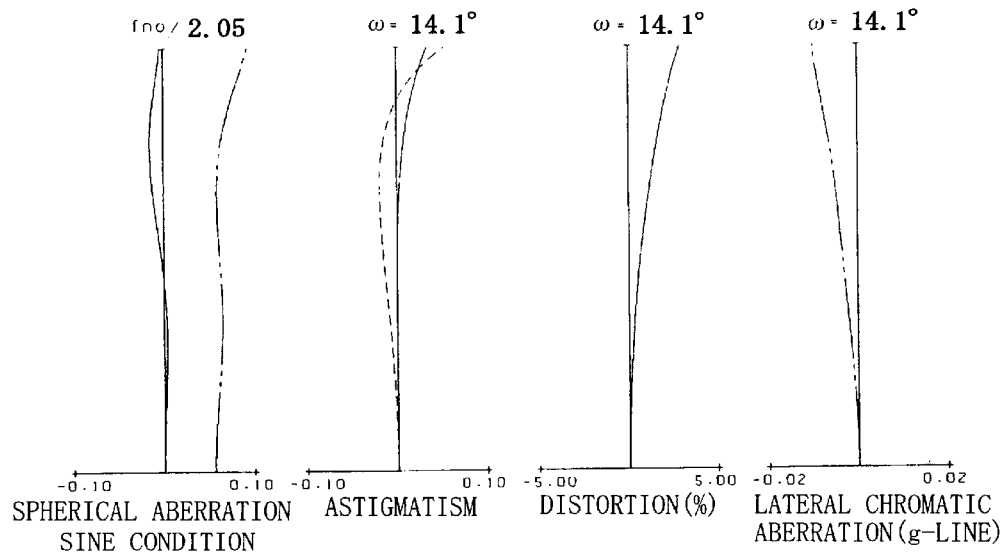
FIG. 23 shows graphic representations of aberrations at a midpoint of the numerical example 7.
Figure 24:
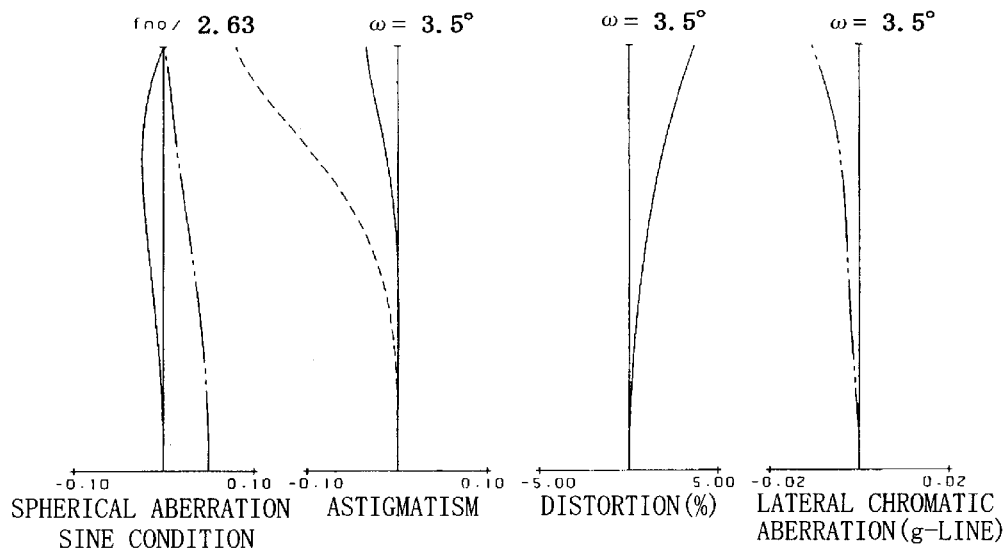
FIG. 24 shows graphic representations of aberrations at a telephoto end of the numerical example 7.

FIG. 21 shows sectional views of essential parts of numerical example 7 of the zoom lens system according to the present invention. FIGS. 22, 23 and 24 respectively show graphic representations of aberrations at a wide-angle end, a midpoint, and a telephoto end zoom point of the numerical example 7.

L1 is a first unit of positive refractive power ("first lens unit"), L2 is a second unit of negative refractive power ("second lens unit"), L3 is a third unit of positive refractive power ("third lens unit"), and L4 is a fourth unit of positive refractive power ("fourth lens unit"). SP is an aperture stop, G is a glass block such as a color separation prism and a face plate. IP is an image plane, at which an image-taking device ("a photoelectric conversion element"), such as a CCD is placed. In the numerical examples 5 to 7, the third unit L3 includes, in order from the object side, a lens subunit L3a ("first lens subunit") of positive refractive power having a positive lens element 3G1 facing a convex surface thereof to the object side, a stop SP, and a lens subunit L3b ("second lens subunit") including a negative lens element 3G2 facing a concave surface ("3bN surface") thereof to the image side, and a positive lens element 3G3 facing a convex surface ("3bP surface) thereof to the object side. The lens subunit L3b is a cemented lens that couples the 3bN surface of the negative lens element 3G2 with the 3bP surface of the positive lens element 3G3. Except for this structure, these examples are the same as the numerical examples 1 to 4, and a duplicate description thereof will be omitted.

This structure in the third unit L3 may make smaller a separation between the second unit L2 and the third unit L3 that becomes the shortest at the longest focal length end in the entire system (i.e., the telephoto end) than the four-unit zoom lens in which the stop SP is located just in front of the third lens unit L3, thus improving the zoom efficiency and reducing the lens span. The space in which the stop SP is located between the lens subunit L3a and the lens subunit L3b may prevent the deterioration in the optical performance caused by the relative axial shift between the lens subunit L3a and the lens subunit L3b in the third unit L3. This configuration in the third unit L3 may make the principal point of the third unit L3 relatively closer to the second unit L2, shorten a distance from the third unit L3 to the image plane, and facilitate the miniaturization of the lens span.

In addition, the numerical examples 5 to 7 use an aspheric lens surface for the positive lens element 3G1 at the object side. The numerical examples 6 and 7 provide the second unit L2 with an aspherical surface, thereby preventing the image plane curve at the wide-angle end from being under.

The zoom lens system of each numerical example may satisfy the following conditions:

$$0.08 < Dab/f3 < 0.64 \quad (1')$$

$$1.67 < 3G1n < 1.89 \quad (2')$$

$$0.71 < f3/f4 < 1.41 \quad (6')$$

$$0.64 < (3G3R2+3G3R1)/(3G3R2-3G3R1) < 1.64 \quad (7')$$

$$-0.81 < 3af/3bf < 0.35 \quad (8')$$

$$0.01 < (D12w+D23t)/BD2 < 0.84 \quad (9')$$

where Dab is a separation between the lens subunit L3a (positive lens 3G1) and the lens subunit L3b, 3G1n is a refractive index of a material of the positive lens element 3G1 fi is a focal length of the i-th lens unit, 3G3R1 and 3G3R2, respectively, are paraxial radiuses of curvature on surfaces at the object and image sides of the positive lens element 3G3, 3af and 3bf are focal lengths of the lens subunit L3a and lens subunit L3b, respectively, D12w is a separation between first unit L1 second unit L2 when the zoom lens system has the shortest focal length (or is located at the wide-angle end), D23t is a separation between the second unit L2 and the third unit L3 when the zoom lens system has the longest focal length (or is located at the telephoto end), and BD2 is a separation between a surface closest to the object side and a surface closest to the image side in the second unit L2. The zoom lens system of the present invention provides the following effects resulting from these equations by satisfying at least one of these equations (1'), (2') and (6') to (9').

Next follows a description of technical meanings of each of the above equations.

The equation (1') relates to a separation between the lens subunit L3a of (the positive lens 3G1) closest to the object side and the lens subunit L3b in the third unit L3. When it exceeds the upper limit, the separation in the third unit L3 becomes too large and the entire lens system becomes disadvantageously bulk. The upper limit is set preferably to be 0.49, and more preferably to be 0.34. When it exceeds the lower limit, the performance deterioration caused by the relative shaft shift between the lens subunit L3a and the lens subunit L3b becomes disadvantageously large. The lower limit is set preferably to be 0.10, and more preferably to be 0.12.

The equation (2') relates to the refractive index of the material of the positive lens element 3G1. When the refractive index becomes high enough to exceed the upper limit, the image plane curves from the middle to the maximum image height excessively and the high performance cannot be maintained. The upper limit is set preferably to be 1.84. When the refractive index becomes low enough to exceed the lower limit, the spherical aberration becomes too large at the positive lens element 3G1 to maintain the high performance. The lower limit is set preferably to be 1.72 and more preferably to be 1.77.

The equation (6') relates to a ratio of the focal length of the third unit L3 to that of the fourth unit L4. When the refractive power of the fourth unit L4 becomes strong enough to exceed the upper limit, the number of lenses in the fourth lens unit to properly correct aberrations increases, and the lens span becomes too long. The upper limit is set preferably to be 1.31, and more preferably to be 1.21. When the refractive power of the fourth unit L4 becomes weak enough to exceed the lower limit, the shift amount to correct the image plane during zooming or the shift amount for focusing becomes too long, and the lens span disadvantageously becomes too long. The lower limit is set preferably to be 0.79 and more preferably to be 0.86.

The equation (7') relates to a shape of the positive lens element 3G3 to be coupled with the negative lens element 3G2 in the lens subunit L3b. When it exceeds the upper limit, the negative refractive power of a surface in the positive lens element 3G3 at the image side becomes too strong at the lens surface 3GR2, and the spherical aberration becomes disadvantageously large at the plus side. The upper limit is set preferably to be 1.48, and more preferably to be 1.33. When it exceeds the lower limit, the positive refractive power of a surface of the positive lens element 3G3 at the image side becomes too strong and the spherical aberration disadvantageously becomes too large at the minus side. The lower limit is set preferably to be 0.71 and more preferably to be 0.79.

The equation (8') relates to a ratio of a focal length of the lens subunit L3a to that of the lens subunit L3b. When it exceeds the upper limit, the positive refractive power of the lens subunit L3a becomes too weak, the principal point of the third unit L3 recedes from the second unit L2, and it is difficult to reduce the lens span. The upper limit is set preferably to be 0.27, and more preferably to be 0.19. When it exceeds the lower limit and the negative refractive power in the lens subunit L3b becomes too strong, the spherical aberration becomes disadvantageously large at the plus side. The lower limit is set preferably to be −0.54 and more preferably to be −0.36.

The equation (9') relates to a ratio of thickness of the second unit L2 on the optical axial to a sum of a separation D12w between the first and second units L1 and L2 at the shortest focal length end, and a separation D23t between the second and third units L2 and L3 at the longest focal length end. It exceeds the upper limit in a first case where the separation D12w or D23t becomes large or in a second case where the separation BD2 becomes small. In the first case, the separation before and after the second unit L2 is too large, the zoom efficiency becomes bad and the high zooming becomes difficult. In the second case, no space enough to constitute the second unit L2 with a plurality of lenses is available and thus it is difficult to properly reduce the aberrational fluctuations during zooming. For high zoom purposes, the upper limit is set preferably to be 0.63, more preferably to be 0.42, and most preferably to be 0.30. It exceeds the lower limit when the separation BD2 becomes large. When it exceeds the lower limit, the distance between the first unit L1 and the stop SP becomes large and the front lens diameter becomes large. For miniaturization purposes, the lower limit is set preferably to be 0.02, more preferably to be 0.04, and still preferably to be 0.08, and most preferably to be 0.16.

Figure 25:
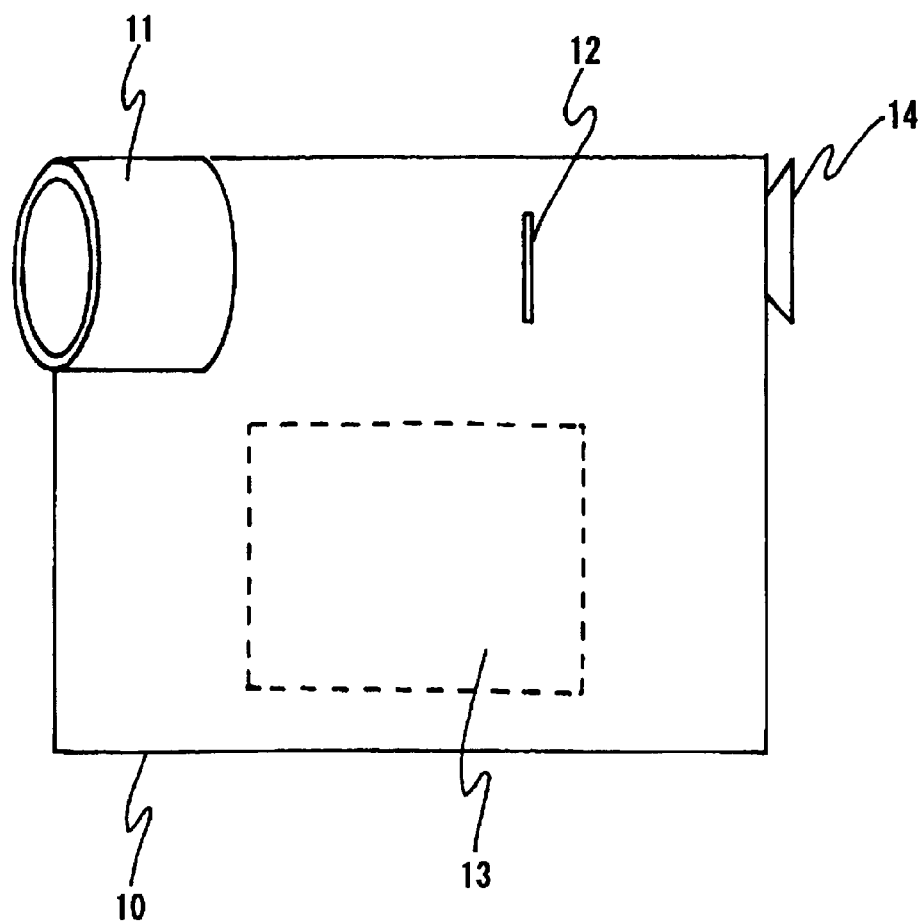
FIG. 25 shows a video camera using the zoom lens of the present invention.

Next follows a description of a video camera (optical apparatus) using a zoom lens system as a shooting system of an embodiment according to the present invention, with reference to FIG. 25.

In FIG. 25, 10 denotes a video camera body, 11 denotes a shooting optical system including the zoom lens of the present invention, 12 denotes an image-taking device ("a photoelectric conversion element"), such as a CCD or CMOS, that receives a subject image from the shooting optical system 11, 13 denotes a memory for recording the subject image received by the image-taking device 12, 14 denotes a finder system for observing a subject image displayed on a display (not shown).

Thus, an application of the inventive zoom lens system to an optical apparatus such as a video camera would render small the optical apparatus and enhance the optical performance.

Next follows numerical examples of the present invention.

In these numerical examples, ri represents a radius of curvature of the i-th surface, di represents a separation between the i-th and i+1-th surfaces in order from the object side, ni and vi are the refractive power and Abbe number of the material of the i-th optical member in order from the object side.

The aspheric shape is expressed by the following equation:

$$X = \frac{(1/R)H^2}{1 + \sqrt{1 - (1+K)(H/R)^2}} + AH^2 + BH^4 + CH^6 + DH^8 + EH^{10}$$

where the aspheric shape sets the optical axis direction to be an X axis, the direction perpendicular to the optical axis to be an H axis, the light progress direction to be positive, R is the paraxial radius of curvature, H, A, B, C, D, E are aspheric coefficients. In addition, "e-z" means "$10^{-z}$", for instance.

In the numerical examples, the last two surfaces are a glass block, such as a face place, filter, etc. Table 1 shows a relationship between the above equations and various numerical values in the numerical examples.

NUMERICAL EXAMPLE 1

| | f = 4.32~42.02 | FNo = 1: 1.65~2.88 | 2ω = 48.6°~6.2° | |
|---|---|---|---|---|
| r1 = 45.054 | | d1 = 1.40 | n1 = 1.84666 | v1 = 23.9 |
| r2 = 25.429 | | d2 = 6.96 | n2 = 1.48749 | v2 = 70.2 |
| r3 = −171.864 | | d3 = 0.20 | | |
| r4 = 21.420 | | d4 = 3.55 | n3 = 1.77250 | v3 = 49.6 |
| r5 = 56.119 | | d5 = Variable | | |
| r6 = 62.351 | | d6 = 0.60 | n4 = 1.84666 | v4 = 23.9 |
| r7 = 5.298 | | d7 = 2.81 | | |
| r8 = −14.229 | | d8 = 0.50 | n5 = 1.78590 | v5 = 44.2 |
| r9 = 137.803 | | d9 = 0.20 | | |
| r10 = 11.940 | | d10 = 2.74 | n6 = 1.84666 | v6 = 23.9 |
| r11 = −11.940 | | d11 = 0.50 | n7 = 1.60311 | v7 = 60.6 |
| r12 = 19.515 | | d12 = Variable | | |
| r13 = | (Stop) | d13 = 3.30 | | |
| r14 = 12.798 | ** | d14 = 1.89 | n8 = 1.80610 | v8 = 40.7 |
| r15 = 99.912 | | d15 = 3.83 | | |
| r16 = 22.767 | | d16 = 0.50 | n9 = 1.84666 | v9 = 23.9 |
| r17 = 7.926 | | d17 = 2.70 | n10 = 1.48749 | v10 = 70.2 |
| r18 = −33.906 | | d18 = 1.01 | | |
| r19 = 0.000 | | d19 = Variable | | |
| r20 = 13.355 | | d20 = 2.66 | n11 = 1.78590 | v11 = 44.2 |
| r21 = −13.355 | | d21 = 0.50 | n12 = 1.84666 | v12 = 23.9 |
| r22 = 175.611 | | d22 = Variable | | |
| r23 = ∞ | | d23 = 3.60 | n13 = 1.51633 | v13 = 64.1 |
| r24 = ∞ | | | | |

| | | Focal Length | | |
|---|---|---|---|---|
| Variable Separation | fw 4.32 | fsw 5.33 | fm 17.78 | ft 42.02 |
| d5 | 0.84 | 3.67 | 15.02 | 19.75 |

-continued

| | f = 4.32~42.02 | FNo = 1: 1.65~2.88 | 2ω = 48.6°~6.2° | |
|---|---|---|---|---|
| d12 | 20.60 | 17.76 | 6.42 | 1.69 |
| d19 | 3.44 | 2.91 | 1.12 | 4.12 |
| d22 | 3.49 | 4.02 | 5.81 | 2.81 |

Aspherical Surface Coefficients

| | K | A | B | C | D | E |
|---|---|---|---|---|---|---|
| 14th Surface | −7.0131e−01 | 0.0000e+00 | −1.8642e−05 | −2.0047e−07 | 1.5637e−08 | −1.9706e−10 |

**(Aspherical surface)

NUMERICAL EXAMPLE 2

| | f = 4.31~42.08 | FNo = 1: 1.65~2.88 | 2ω = 48.6°~6.2° | |
|---|---|---|---|---|
| r1 = 46.469 | | d1 = 1.40 | n1 = 1.84666 | ν1 = 23.9 |
| r2 = 24.226 | | d2 = 7.19 | n2 = 1.48749 | ν2 = 70.2 |
| r3 = −211.816 | | d3 = 0.20 | | |
| r4 = 21.693 | | d4 = 3.76 | n3 = 1.77250 | ν3 = 49.6 |
| r5 = 67.659 | | d5 = Variable | | |
| r6 = 92.075 | | d6 = 0.60 | n4 = 1.83400 | ν4 = 37.2 |
| r7 = 5.742 | | d7 = 2.33 | | |
| r8 = −16.244 | | d8 = 0.50 | n5 = 1.88300 | ν5 = 40.8 |
| r9 = 34.235 | | d9 = 0.57 | | |
| r10 = 14.795 | | d10 = 2.02 | n6 = 1.84666 | ν6 = 23.9 |
| r11 = −20.997 | | d11 = 0.50 | n7 = 1.48749 | ν7 = 70.2 |
| r12 = 59.229 | | d12 = Variable | | |
| r13 = | (Stop) | d13 = 3.30 | | |
| r14 = 12.258 | ** | d14 = 2.01 | n8 = 1.80610 | ν8 = 40.7 |
| r15 = 147.057 | | d15 = 3.41 | | |
| r16 = 19.465 | | d16 = 0.50 | n9 = 1.84666 | ν9 = 23.9 |
| r17 = 6.946 | | d17 = 2.79 | n10 = 1.48749 | ν10 = 70.2 |
| r18 = −111.838 | | d18 = 1.22 | | |
| r19 = 0.000 | | d19 = Variable | | |
| r20 = 13.361 | ** | d20 = 2.45 | n11 = 1.74330 | ν11 = 49.3 |
| r21 = −16.742 | | d21 = 0.50 | n12 = 1.84666 | ν12 = 23.9 |
| r22 = −118.449 | | d22 = Variable | | |
| r23 = ∞ | | d23 = 3.60 | n13 = 1.51633 | ν13 = 64.1 |
| r24 = ∞ | | | | |

| | Focal Length | | | |
|---|---|---|---|---|
| Variable Separation | fw 4.31 | fsw 5.32 | fm 17.82 | ft 42.08 |
| d5 | 0.87 | 3.74 | 15.22 | 20.01 |
| d12 | 20.58 | 17.71 | 6.22 | 1.44 |
| d19 | 3.39 | 2.87 | 1.11 | 4.01 |
| d22 | 3.45 | 3.97 | 5.73 | 2.84 |

Aspherical Surface Coefficients

| | K | A | B | C | D | E |
|---|---|---|---|---|---|---|
| 14th Surface | −1.6008e+00 | 0.0000e+00 | 6.4435e−05 | −1.6747e−06 | 8.1563e−08 | −1.3535e−09 |
| 20th Surface | 1.9847e+00 | 0.0000e+00 | −1.4203e−04 | −3.8896e−08 | −3.3482e−09 | −9.6537e−10 |

**(Aspherical surface)

NUMERICAL EXAMPLE 3

| | f = 4.32~41.99 | FNo = 1: 1.65~2.88 | 2ω = 48.6°~6.2° |
|---|---|---|---|
| r1 = 45.339 | d1 = 1.40 | n1 = 1.84666 | ν1 = 23.9 |
| r2 = 25.277 | d2 = 7.15 | n2 = 1.48749 | ν2 = 70.2 |

-continued

| | f = 4.32~41.99 | FNo = 1: 1.65~2.88 | 2ω = 48.6°~6.2° | |
|---|---|---|---|---|
| r3 = −143.743 | | d3 = 0.20 | | |
| r4 = 21.093 | | d4 = 3.63 | n3 = 1.77250 | ν3 = 49.6 |
| r5 = 55.734 | | d5 = Variable | | |
| r6 = 116.971 | | d6 = 0.60 | n4 = 1.84666 | ν4 = 23.9 |
| r7 = 5.139 | | d7 = 2.49 | | |
| r8 = −18.998 | | d8 = 0.50 | n5 = 1.83481 | ν5 = 42.7 |
| r9 = 35.255 | | d9 = 0.46 | | |
| r10 = 10.708 | | d10 = 2.74 | n6 = 1.84666 | ν6 = 23.9 |
| r11 = −13.620 | | d11 = 0.50 | n7 = 1.48749 | ν7 = 70.2 |
| r12 = 13.402 | | d12 = Variable | | |
| r13 = | (Stop) | d13 = 3.30 | | |
| r14 = 12.950 | ** | d14 = 2.02 | n8 = 1.74330 | ν8 = 49.3 |
| r15 = 1012.660 | | d15 = 4.45 | | |
| r16 = 18.159 | | d16 = 0.50 | n9 = 1.84666 | ν9 = 23.9 |
| r17 = 7.410 | | d17 = 2.59 | n10 = 1.48749 | ν10 = 70.2 |
| r18 = −123.906 | | d18 = 1.19 | | |
| r19 = 0.000 | | d19 = Variable | | |
| r20 = 12.940 | ** | d20 = 2.50 | n11 = 1.74330 | ν11 = 49.3 |
| r21 = −16.087 | | d21 = 0.50 | n12 = 1.84666 | ν12 = 23.9 |
| r22 = −250.473 | | d22 = Variable | | |
| r23 = ∞ | | d23 = 3.60 | n13 = 1.51633 | ν13 = 64.1 |
| r24 = ∞ | | | | |

| | Focal Length | | | |
|---|---|---|---|---|
| Variable Separation | fw 4.32 | fsw 5.31 | fm 17.49 | ft 41.99 |
| d5 | 0.95 | 3.69 | 14.69 | 19.27 |
| d12 | 20.15 | 17.40 | 6.40 | 1.82 |
| d19 | 3.38 | 2.86 | 1.10 | 4.03 |
| d22 | 3.34 | 3.87 | 5.63 | 2.70 |

| | Aspherical Surface Coefficients | | | | |
|---|---|---|---|---|---|
| | K | A | B | C | D | E |
| 14th Surface | −1.4116e+00 | 0.0000e+00 | 2.7609e−05 | −8.5019e−07 | 3.6190e−08 | −4.3523e−10 |
| 20th Surface | 1.8680e+00 | 0.0000e+00 | −1.2375e−04 | −2.0008e−06 | 9.8823e−08 | −3.1643e−09 |

**(Aspherical surface)

NUMERICAL EXAMPLE 4

| | f = 4.31~42.12 | FNo = 1: 1.65~2.88 | 2ω = 48.7°~6.2° | |
|---|---|---|---|---|
| r1 = 44.565 | | d1 = 1.45 | n1 = 1.84666 | ν1 = 23.9 |
| r2 = 25.040 | | d2 = 7.24 | n2 = 1.48749 | ν2 = 70.2 |
| r3 = −203.743 | | d3 = 0.20 | | |
| r4 = 21.679 | | d4 = 3.65 | n3 = 1.77250 | ν3 = 49.6 |
| r5 = 59.170 | | d5 = Variable | | |
| r6 = 82.998 | | d6 = 0.60 | n4 = 1.84666 | ν4 = 23.9 |
| r7 = 5.153 | | d7 = 2.53 | | |
| r8 = −14.931 | | d8 = 0.50 | n5 = 1.83481 | ν5 = 42.7 |
| r9 = 45.695 | | d9 = 0.41 | | |
| r10 = 12.315 | | d10 = 2.71 | n6 = 1.84666 | ν6 = 23.9 |
| r11 = −11.907 | | d11 = 0.50 | n7 = 1.48749 | ν7 = 70.2 |
| r12 = 18.654 | | d12 = Variable | | |
| r13 = | (Stop) | d13 = 3.30 | | |
| r14 = 11.960 | ** | d14 = 2.05 | n8 = 1.80610 | ν8 = 40.7 |
| r15 = 145.708 | | d15 = 3.12 | | |
| r16 = 18.859 | | d16 = 0.50 | n9 = 1.84666 | ν9 = 23.9 |
| r17 = 6.813 | | d17 = 2.94 | n10 = 1.48749 | ν10 = 70.2 |
| r18 = −59.298 | | d18 = 1.11 | | |
| r19 = ∞ | | d19 = Variable | | |
| r20 = 14.619 | ** | d20 = 2.40 | n11 = 1.74330 | ν11 = 49.3 |
| r21 = −14.858 | | d21 = 0.50 | n12 = 1.84666 | ν12 = 23.9 |
| r22 = −202.340 | | d22 = Variable | | |
| r23 = ∞ | | d23 = 3.60 | n13 = 1.51633 | ν13 = 64.1 |
| r24 = ∞ | | | | |

-continued f = 4.31~42.12  FNo = 1: 1.65~2.88  2ω = 48.7°~6.2°

| Variable Separation | Focal Length | | | |
|---|---|---|---|---|
| | fw 4.31 | fsw 5.31 | fm 17.70 | ft 42.12 |
| d5 | 1.03 | 3.90 | 15.37 | 20.15 |
| d12 | 20.81 | 17.94 | 6.46 | 1.68 |
| d19 | 3.82 | 3.21 | 1.13 | 4.14 |
| d22 | 3.02 | 3.63 | 5.71 | 2.70 |

Aspherical Surface Coefficients

| | K | A | B | C | D | E |
|---|---|---|---|---|---|---|
| 14th Surface | −7.8389e−01 | 0.0000e+00 | −2.9588e−06 | −2.9295e−07 | 1.1550e−08 | −3.5684e−11 |
| 20th Surface | 5.8552e−01 | 0.0000e+00 | −4.2510e−05 | 9.2171e−07 | 1.1404e−08 | −7.2359e−10 |

**(Aspherical surface)

TABLE 1

| Equations | Numerical Example 1 | Numerical Example 2 | Numerical Example 3 | Numerical Example 4 |
|---|---|---|---|---|
| (1) | 0.227 | 0.200 | 0.262 | 0.196 |
| (2) | 1.84666 | 1.834 | 1.84666 | 1.84666 |
| (3) | 0.982 | 1.044 | 0.937 | 0.940 |
| (4) | 23.9 | 37.2 | 23.9 | 23.9 |
| (5) | 0.419 | 0.593 | 0.432 | 0.485 |
| (6) | 0.849 | 0.963 | 0.928 | 0.768 |
| (7) | 0.621 | 0.883 | 0.887 | 0.794 |
| (8) | 0.122 | −0.053 | 0.047 | 0.017 |

NUMERICAL EXAMPLE 5 f = 4.30~41.97  FNo = 1: 1.85~3.00  2ω = 55.3°~6.1°

| | | | |
|---|---|---|---|
| r1 = 30.695 | d1 = 1.00 | n1 = 1.84666 | ν1 = 23.9 |
| r2 = 14.698 | d2 = 4.70 | n2 = 1.67790 | ν2 = 55.3 |
| r3 = −80.893 | d3 = 0.17 | | |
| r4 = 11.465 | d4 = 2.21 | n3 = 1.58913 | ν3 = 61.1 |
| r5 = 24.815 | d5 = Variable | | |
| r6 = 23.515 | d6 = 0.50 | n4 = 1.88300 | ν4 = 40.8 |
| r7 = 4.124 | d7 = 2.00 | | |
| r8 = −5.063 | d8 = 0.50 | n5 = 1.69680 | ν5 = 55.5 |
| r9 = 5.938 | d9 = 1.75 | n6 = 1.84666 | ν6 = 23.9 |
| r10 = −33.949 | d10 = Variable | | |
| r11 = 7.755 ** | d11 = 1.96 | n7 = 1.80610 | ν7 = 40.7 |
| r12 = 199.841 | d12 = 0.90 | | |
| r13 = (Stop) | d13 = 0.90 | | |
| r14 = 15.573 | d14 = 0.50 | n8 = 1.84666 | ν8 = 23.9 |
| r15 = 4.679 | d15 = 2.85 | n9 = 1.48749 | ν9 = 70.2 |
| r16 = 123.720 | d16 = Variable | | |
| r17 = 9.162 ** | d17 = 2.22 | n10 = 1.58313 | ν10 = 59.4 |
| r18 = −13.243 | d18 = 0.50 | n11 = 1.84666 | ν11 = 23.9 |
| r19 = −19.062 | d19 = Variable | | |
| r20 = ∞ | d20 = 3.60 | n12 = 1.51633 | ν12 = 64.1 |
| r21 = ∞ | | | |

| Variable Separation | Focal Length | | |
|---|---|---|---|
| | 4.30 | 10.23 | 41.97 |
| d5 | 0.60 | 5.55 | 10.50 |
| d10 | 10.50 | 5.55 | 0.60 |
| d16 | 4.65 | 2.11 | 5.07 |
| d19 | 2.92 | 5.45 | 2.49 |

-continued

| | f = 4.30~41.97 | FNo = 1: 1.85~3.00 | | 2ω = 55.3°~6.1° | |
|---|---|---|---|---|---|
| | | Aspherical Surface Coefficients | | | |
| | K | A | B | C | D | E |

| | K | A | B | C | D | E |
|---|---|---|---|---|---|
| 11th Surface | −3.2915e−01 | 0.0000e+00 | −1.5951e−04 | −4.6769e−07 | 6.9515e−09 | 1.3521e−10 |
| 17th Surface | −1.0107e+00 | 0.0000e+00 | −1.3575e−04 | −1.1488e−07 | 4.2422e−08 | 1.6307e−09 |

**(Aspherical surface)

NUMERICAL EXAMPLE 6

| f = 3.79~36.36 | FNo = 1: 1.85~2.62 | 2ω = 61.4°~7.1° |
|---|---|---|
| r1 = 40.696 | d1 = 1.00 | n1 = 1.84666 | ν1 = 23.9 |
| r2 = 13.476 | d2 = 5.20 | n2 = 1.51633 | ν2 = 64.1 |
| r3 = −56.453 | d3 = 0.17 | | |
| r4 = 13.460 | d4 = 2.64 | n3 = 1.83481 | ν3 = 42.7 |
| r5 = 70.639 | d5 = Variable | | |
| r6 = 67.959 | d6 = 0.50 | n4 = 1.88300 | ν4 = 40.8 |
| r7 = 3.914 | d7 = 2.00 | | |
| r8 = −6.347 ** | d8 = 0.50 | n5 = 1.58313 | ν5 = 59.4 |
| r9 = 5.624 | d9 = 1.78 | n6 = 1.84666 | ν6 = 23.9 |
| r10 = 357.817 | d10 = Variable | | |
| r11 = 9.009 ** | d11 = 1.71 | n7 = 1.80610 | ν7 = 40.7 |
| r12 = −197.481 | d12 = 0.90 | | |
| r13 = (Stop) | d13 = 1.90 | | |
| r14 = 17.019 | d14 = 0.50 | n8 = 1.84666 | ν8 = 23.9 |
| r15 = 5.639 | d15 = 1.88 | n9 = 1.48749 | ν9 = 70.2 |
| r16 = 93.344 | d16 = Variable | | |
| r17 = 10.496 ** | d17 = 2.38 | n10 = 1.66910 | ν10 = 55.4 |
| r18 = −7.875 | d18 = 0.50 | n11 = 1.84666 | ν11 = 23.9 |
| r19 = −17.190 | d19 = Variable | | |
| r20 = ∞ | d20 = 3.60 | n12 = 1.51633 | ν12 = 64.1 |
| r21 = ∞ | | | |

| | Focal Length | | |
|---|---|---|---|
| Variable Separation | 3.79 | 8.98 | 36.36 |
| d5 | 0.60 | 5.56 | 10.51 |
| d10 | 10.45 | 5.50 | 0.54 |
| d16 | 4.04 | 1.78 | 4.48 |
| d19 | 2.92 | 5.18 | 2.48 |

| | Aspherical Surface Coefficients | | | | |
|---|---|---|---|---|---|
| | K | A | B | C | D | E |
| 8th Surface | −7.5426e−01 | 0.0000e+00 | −2.4665e−04 | −5.5503e−06 | −2.8815e−06 | −1.2889e−07 |
| 11th Surface | −1.4204e+00 | 0.0000e+00 | 2.1544e−05 | 4.4267e−06 | −6.0715e−07 | 2.4579e−08 |
| 17th Surface | −3.8862e+00 | 0.0000e+00 | 1.4160e−04 | 3.9443e−06 | −9.5635e−07 | 4.8923e−08 |

**(Aspherical surface)

NUMERICAL EXAMPLE 7

| f = 3.75~36.48 | FNo = 1: 1.85~2.63 | 2ω = 61.9°~7.1° |
|---|---|---|
| r1 = 53.219 | d1 = 1.00 | n1 = 1.84666 | ν1 = 23.9 |
| r2 = 13.909 | d2 = 5.05 | n2 = 1.60311 | ν2 = 60.6 |
| r3 = −58.975 | d3 = 0.17 | | |
| r4 = 13.442 | d4 = 2.49 | n3 = 1.88300 | ν3 = 40.8 |
| r5 = 49.007 | d5 = Variable | | |

-continued

| | f = 3.75~36.48 | FNo = 1: 1.85~2.63 | 2ω = 61.9°~7.1° | |
|---|---|---|---|---|
| r6 = 46.478 | | d6 = 0.50 | n4 = 1.88300 | ν4 = 40.8 |
| r7 = 3.872 | | d7 = 2.00 | | |
| r8 = −6.020 | ** | d8 = 0.50 | n5 = 1.66910 | ν5 = 55.4 |
| r9 = 5.068 | | d9 = 2.03 | n6 = 1.84666 | ν6 = 23.9 |
| r10 = −58.520 | | d10 = Variable | | |
| r11 = 8.643 | ** | d11 = 1.80 | n7 = 1.80610 | ν7 = 40.7 |
| r12 = −565.779 | | d12 = 0.90 | | |
| r13 = (Stop) | | d13 = 0.90 | | |
| r14 = 17.755 | | d14 = 0.50 | n8 = 1.84666 | ν8 = 23.9 |
| r15 = 5.706 | | d15 = 2.01 | n9 = 1.48749 | ν9 = 70.2 |
| r16 = 99.482 | | d16 = Variable | | |
| r17 = 11.821 | ** | d17 = 2.59 | n10 = 1.58313 | ν10 = 59.4 |
| r18 = −6.181 | | d18 = 0.50 | n11 = 1.84666 | ν11 = 23.9 |
| r19 = −10.379 | | d19 = Variable | | |
| r20 = ∞ | | d20 = 3.60 | n12 = 1.51633 | ν12 = 64.1 |
| r21 = ∞ | | | | |

| | Focal Length | | |
|---|---|---|---|
| Variable Separation | 3.75 | 8.96 | 36.48 |
| d5 | 0.60 | 5.45 | 10.30 |
| d10 | 10.30 | 5.45 | 0.59 |
| d16 | 4.22 | 1.89 | 4.54 |
| d19 | 3.42 | 5.75 | 3.10 |

| Aspherical Surface Coefficients | | | | | |
|---|---|---|---|---|---|
| | K | A | B | C | D | E |
| 8th Surface | −1.2914e−01 | 0.0000e+00 | 1.3372e−05 | −1.6859e−05 | −1.8417e−06 | −2.1736e−07 |
| 11th Surface | −9.2616e−01 | 0.0000e+00 | −5.5199e−05 | 3.4183e−06 | −3.7245e−07 | 1.3773e−08 |
| 17th Surface | −5.9992e+00 | 0.0000e+00 | 5.8365e−05 | 4.8033e−06 | −1.3664e−06 | 7.7664e−08 |

**(Aspherical surface)

TABLE 2

| Equations | Numerical Example 5 | Numerical Example 6 | Numerical Example 7 |
|---|---|---|---|
| (1') | 0.154 | 0.234 | 0.149 |
| (2') | 1.806 | 1.806 | 1.806 |
| (3') | 1.000 | 1.046 | 1.027 |
| (4') | 1.079 | 1.129 | 1.122 |
| (5') | −0.252 | −0.197 | −0.205 |
| (6') | 0.253 | 0.238 | 0.237 |

Thus, the present embodiment may provide a zoom lens system and optical apparatus using the same, which is suitable to a shooting system using a photoelectric conversion element, compact, and superior in optical performance. Also, the present embodiment may provide a rear focus type of zoom lens system and optical apparatus using the same, with a fast focusing and a high optical performance. The present embodiment may provide a zoom lens system and optical apparatus using the same, with a compact lens system, a high optical performance, a simple structure, and a smaller number of lenses.

Moreover, the present embodiment may provide a zoom lens system and optical apparatus using the same, which defocuses lens units with smaller defocus amounts to correct blurs in an image, maintains a high optical performance and a proper vibration resistance. Furthermore, the present embodiment may provide a zoom lens system and optical apparatus using the same, with a compact lens system, the reduced deterioration of optical performance caused by manufacturing errors, such as axial shifts of respective lenses, a high optical performance, and a smaller number of lenses.

What is claimed is:

1. A zoom lens system comprising, in order from an object side:

a first lens unit of positive refractive power that doesn't move along an optical axis for zooming;

a second lens unit of negative refractive power that moves along the optical axis for zooming;

a third lens unit of positive refractive power that doesn't move along the optical axis for zooming, said third lens unit including, in order from the object side, a first lens subunit of positive refractive power consisting of one or two positive lens element facing to the object side a convex surface of refractive power that is stronger at the object side than an image side, and a second lens subunit including a cemented lens coupling a concave surface of a negative lens element of refractive power that is stronger at the image side than at the object side, with a convex surface of a positive lens element of refractive power that is stronger at the object side than at the image side; and a fourth lens unit of positive refractive power.

2. A zoom lens system according to claim 1, wherein a condition $0.51 < f3/f4 < 1.25$ is satisfied where f3 and f4 are focal lengths of said third and fourth lens units, respectively.

3. A zoom lens system according to claim 1, wherein an image is displaced by moving the third lens unit so as to have a component of a direction perpendicular to an optical axis.

4. A zoom lens system according to claim 1, wherein the fourth lens unit moves along the optical axis for zooming.

5. A zoom lens system according to claim 1, wherein a condition $0.34 < (3G3R2 + 3G3R1)/(3G3R2 − 3G3R1) < 1.34$ is satisfied where 3G3R1 and 3G3R2, respectively, are paraxial radiuses of curvature of surfaces at the object and image sides of the positive lens element that constitutes the cemented lens of the second lens subunit.

6. A zoom lens system according to claim 1, wherein a condition
−0.25<3af/3bf<0.35 is satisfied where 3af and 3bf are focal lengths of the first and second lens subunits, respectively.

7. A zoom lens system according to claim 1, wherein said system is an optical system for forming an image on a photoelectric conversion element.

8. An optical apparatus comprising:
a zoom lens system according to claim 1; and
a photoelectric conversion element for receiving an image formed by said zoom lens system.

9. A zoom lens system comprising, in order from an object side:
a first lens unit of positive refractive power;
a second lens unit of negative refractive power that moves along the optical axis for zooming;
a third lens unit of positive refractive power including, in order from the object side, a first lens subunit of positive refractive power consisting of one or two positive lens elements facing to the object side a convex surface of refractive power that is stronger at the object side than an image side, and a second lens subunit including a cemented lens coupling a concave surface of a negative lens element of refractive power that is stronger at the image side than at the object side, with a convex surface of a positive lens element of refractive power that is stronger at the object side than at the image side; and
a fourth lens unit of positive refractive power,
wherein a condition 0.09<Dab/f3<0.35 is satisfied where Dab is a separation between the first lens subunit and the second lens subunit, and f3 is a focal length of said third lens unit.

10. A zoom lens system according to claim 9, wherein a condition 0.51<f3/f4<1.25 is satisfied where f3 and f4 are focal lengths of said third and fourth lens units, respectively.

11. A zoom lens system according to claim 9, wherein an image is displaced by moving the third lens unit so as to have a component of a direction perpendicular to an optical axis.

12. A zoom lens system according to claim 9, wherein the fourth lens unit moves along the optical axis for zooming.

13. A zoom lens system according to claim 9, wherein a condition 0.34<(3G3R2+3G3R1)/(3G3R2−3G3R1)<1.34 is satisfied where 3G3R1 and 3G3R2, respectively, are paraxial radiuses of curvature on surfaces at the object and image sides of the positive lens element that constitutes the cemented lens of the second lens subunit.

14. A zoom lens system according to claim 9, wherein a condition
−0.25<3af/3bf<0.35 is satisfied where 3af and 3bf are focal lengths of the first and second lens subunits, respectively.

15. A zoom lens system according to claim 9, wherein said system is an optical system for forming an image on a photoelectric conversion element.

16. An optical apparatus comprising:
a zoom lens system according to claim 9; and
a photoelectric conversion element for receiving an image formed by said zoom lens system.

17. A zoom lens system comprising, in order from an object side:
a first lens unit of positive refractive power;
a second lens unit of negative refractive power that moves along the optical axis for zooming;
a third lens unit of positive refractive power including, in order from the object side, a first lens subunit of positive refractive power consisting of one or two positive lens elements facing to the object side a convex surface of refractive power that is stronger at the object side than an image side, and a second lens subunit including a cemented lens coupling a concave surface of a negative lens element of refractive power stronger at the image side, with a convex surface of a positive lens element of refractive power stronger at the object side; and
a fourth lens unit of positive refractive power,
wherein a condition 1.67<3G1n<1.89 is satisfied where 3G1 is one of positive lens element with an aspherical surface among the first lens subunit, and 3G1n is a refractive index of a material of the positive lens element assigned to 3G1.

18. A zoom lens system according to claim 17, wherein a condition 0.51<f3/f4<1.25 is satisfied where f3 and f4 are focal lengths of said third and fourth lens units, respectively.

19. A zoom lens system according to claim 17, wherein an image is displaced by moving the third lens unit so as to have a component of a direction perpendicular to an optical axis.

20. A zoom lens system according to claim 17, wherein the fourth lens unit moves along the optical axis for zooming.

21. A zoom lens system according to claim 17, wherein a condition 0.34<(3G3R2+3G3R1)/(3G3R2−3G3R1)<1.34 is satisfied where 3G3R1 and 3G3R2, respectively, are paraxial radiuses of curvature on surfaces at the object and image sides of the positive lens element that constitutes the cemented lens of the second lens subunit.

22. A zoom lens system according to claim 17, wherein a condition 0.09<Dab/f3<0.35 is satisfied where Dab is a separation between the first lens subunit and the second lens subunit, and f3 is a focal length of the third lens unit.

23. A zoom lens system according to claim 17, wherein a condition
−0.25<3af/3bf<0.35 is satisfied where 3af and 3bf are focal lengths of the first and second lens subunits, respectively.

24. A zoom lens system according to claim 17, wherein said system is an optical system for forming an image on a photoelectric conversion element.

25. An optical apparatus comprising:
a zoom lens system according to claim 17; and
a photoelectric conversion element for receiving an image formed by said zoom lens system.

26. A zoom lens system comprising, in order from an object side:
a first lens unit of positive refractive power;
a second lens unit of negative refractive power that moves along the optical axis for zooming, said second lens unit including, in order from the object side, a first negative lens element, a second negative lens element, a third positive lens element, and a fourth negative lens element;
a third lens unit of positive refractive power; and
a fourth lens unit of positive refractive power,
wherein conditions 0.81<2G1f/f2<1.25, 20.5<2G1v<37.5, and 0.21<2G1f/2G2f<0.81 are satisfied where 2G1f is a focal length of the first negative lens element, 2G2f is a focal length of the second negative lens element, f2 is a focal length of said second lens unit, 2G1v is Abbe number of a material of the first negative lens element.

27. A zoom lens system according to claim 26, wherein a condition 0.51<f3/f4<1.25 is satisfied where f3 and f4 are focal lengths of said third and fourth lens units, respectively.

28. A zoom lens system according to claim 26, wherein an image is displaced by moving the third lens unit so as to have a component of a direction perpendicular to an optical axis.

29. A zoom lens system according to claim 26, wherein the fourth lens unit moves along the optical axis for zooming.

30. A zoom lens system according to claim 26, wherein said third lens unit includes, in order from the object side, a first lens subunit of positive refractive power consisting of one or two positive lens elements facing to the object side a convex surface of refractive power that is stronger at the object side than at an image side, and a second lens subunit including a cemented lens coupling a concave surface of a negative lens element of refractive power that is stronger at the image side than at the object side, and a convex surface of a positive lens element of refractive power that is stronger at the object side than at the image side.

31. A zoom lens system according to claim 26, wherein said system is an optical system for forming an image on a photoelectric conversion element.

32. An optical apparatus comprising:
a zoom lens system according to claim 26; and
a photoelectric conversion element for receiving an image formed by said zoom lens system.

33. A zoom lens system comprising, in order from an object side:
a first lens unit of positive refractive power;
a second lens unit of negative refractive power that moves along the optical axis for zooming;
a third lens unit of positive refractive power including, in order from the object side, a first lens subunit of positive refractive power consisting of one or two positive lens elements facing to the object side a convex surface, and a second lens subunit including a cemented lens coupling a negative lens element facing a concave surface thereof to the image side, with a positive lens element facing a convex surface thereof to the object side; and
a fourth lens unit of positive refractive power,
wherein conditions $0.09<Dab/f3<0.35$, $0.5<f3/f4<1.25$, $0.34<(3G3R2+3G3R1)/(3G3R2-3G3R1)<1.34$, and $-0.25<3af/3bf<0.35$ are satisfied where Dab is a separation between the first lens subunit and the second lens subunit at the object side, f3 and f4 are focal lengths of said third and fourth lens units, respectively, 3af and 3bf are focal lengths of the first and second lens subunits, respectively, and 3G3R1 and 3G3R2, respectively, are paraxial radiuses of curvature on surfaces at the object and image sides of the positive lens element that constitutes the cemented lens of said second lens subunit.

34. A zoom lens system according to claim 33, wherein a condition $1.67<3G1n<1.89$ is satisfied where 3G1 is one of positive lens element with an aspherical surface facing a concave surface to the object side among the first lens subunit, and 3G1n is a refractive index of a material of the positive lens element assigned to 3G1.

35. A zoom lens system according to claim 33, wherein said second lens unit includes, in order from the object side, a first negative lens element, a second negative lens element, a third positive lens element, and fourth negative lens element, and
wherein conditions $0.81<2G1f/f2<1.25$, $20.5<2G1v<37.5$, and $0.21<2G1f/2G2f<0.81$ are satisfied where 2G1f is a focal length of the first negative lens element in said second lens unit, 2G2f is a focal length of the second negative lens element in said second lens unit, f2 is a focal length of said second lens unit, and 2G1v is Abbe number of a material of the first negative lens element in said second lens unit.

36. A zoom lens system according to claim 33, wherein the fourth lens unit moves along the optical axis for zooming.

37. A zoom lens system according to claim 33, wherein an image is displaced by moving the third lens unit so as to have a component of a direction perpendicular to an optical axis.

38. A zoom lens system according to claim 33, wherein said system is an optical system for forming an image on a photoelectric conversion element.

39. An optical apparatus comprising:
zoom lens system according to claim 33; and
a photoelectric conversion element for receiving an image formed by said zoom lens system.

40. A zoom lens system comprising, in order from an object side:
a first lens unit of positive refractive power that doesn't move along an optical axis for zooming;
a second lens unit of negative refractive power that moves along the optical axis for zooming;
a third lens unit of positive refractive power including, in order from the object side, a first lens subunit of positive refractive power having a positive lens element facing a convex surface thereof to the object side, a stop, and a second lens subunit including a cemented lens coupling a negative lens element facing a concave surface thereof to the image side, with a positive lens element facing a convex surface thereof to the object side; and
a fourth lens unit of positive refractive power.

41. A zoom lens system according to claim 40, wherein a condition $0.71<f3/f4<1.41$ is satisfied where f3 and f4 are focal lengths of said third and fourth lens units, respectively.

42. A zoom lens system according to claim 40, wherein said second lens unit has an aspherical surface.

43. A zoom lens system according to claim 40, wherein the fourth lens unit moves along the optical axis for zooming.

44. A zoom lens system according to claim 40, wherein a condition $0.64<(3G3R2+3G3R1)/(3G3R2-3G3R1)<1.64$ is satisfied where 3G3R1 and 3G3R2, respectively, are paraxial radiuses of curvature on surfaces at the object and image sides of the positive lens element that constitutes the cemented lens of the second lens subunit.

45. A zoom lens system according to claim 40, wherein a condition
$-0.81<3af/3bf<0.35$ is satisfied where 3af and 3bf are focal lengths of the first and second lens subunits, respectively.

46. A zoom lens system according to claim 40, wherein a condition $0.01<(D12w+D23t)/BD2<0.84$ is satisfied where D12w is a separation between said first and second lens units when said zoom lens system has the shortest focal length, D23t is a separation between said second and third lens units when said zoom lens system has the shortest focal length, and BD2 is a separation between a surface closest to the object side and a surface closest to the image side in said second lens unit.

47. A zoom lens system according to claim 40, wherein said system is an optical system for forming an image on a photoelectric conversion element.

48. An optical apparatus comprising:
a zoom lens system according to claim 40; and
a photoelectric conversion element for receiving an image formed by said zoom lens system.

49. A zoom lens system comprising, in order from an object side:
a first lens unit of positive refractive power;
a second lens unit of negative refractive power;
a third lens unit of positive refractive power including, in order from the object side, a first lens subunit of positive refractive power having a positive lens element facing a convex surface thereof to the object side, a stop, and a second lens subunit including a cemented lens coupling a negative lens element facing a concave surface thereof to the image side, with a positive lens element facing a convex surface thereof to the object side; and
a fourth lens unit of positive refractive power,
wherein a condition 0.08<Dab/f3<0.64 is satisfied where Dab is a separation between said first and second lens subunits, and f3 is a focal length of said third lens unit.

50. A zoom lens system according to claim 49, wherein a condition 0.71<f3/f4<1.41 is satisfied where f3 and f4 are focal lengths of said third and fourth lens units, respectively.

51. A zoom lens system according to claim 49, wherein said second lens unit has an aspherical surface.

52. A zoom lens system according to claim 49, wherein the second lens unit and the fourth lens unit move along the optical axis for zooming.

53. A zoom lens system according to claim 49, wherein a condition 0.64<(3G3R2+3G3R1)/(3G3R2−3G3R1)<1.64 is satisfied where 3G3R1 and 3G3R2, respectively, are paraxial radiuses of curvature on surfaces at the object and image sides of the positive lens element that constitutes the cemented lens of the second lens subunit.

54. A zoom lens system according to claim 49, wherein a condition
−0.81<3af/3bf<0.35 is satisfied where 3af and 3bf are focal lengths of the first and second lens subunits, respectively.

55. A zoom lens system according to claim 49, wherein a condition 0.01<(D12w+D23t)/BD2<0.84 is satisfied where D12w is a separation between said first and second lens units when said zoom lens system has the shortest focal length, D23t is a separation between said second and third lens units when said zoom lens system has the shortest focal length, and BD2 is a separation between a surface closest to the object side and a surface closest to the image side in said second lens unit.

56. A zoom lens system according to claim 49, wherein said system is an optical system for forming an image on a photoelectric conversion element.

57. An optical apparatus comprising:
a zoom lens system according to claim 49; and
a photoelectric conversion element for receiving an image formed by said zoom lens system.

58. A zoom lens system comprising, in order from an object side:
a first lens unit of positive refractive power;
a second lens unit of negative refractive power;
a third lens unit of positive refractive power including, in order from the object side, a first positive lens element having an aspherical surface facing a convex surface thereof to the object side, a stop, and a negative lens element facing a concave surface thereof to the image side, and a second positive lens element facing a convex surface thereof to the object side; and
a fourth lens unit of positive refractive power,
wherein a condition 1.67<3G1n<1.89 is satisfied where 3G1n is a refractive index of a material of the first positive lens element in said third lens unit.

59. A zoom lens system according to claim 58, wherein a condition 0.71<f3/f4<1.41 is satisfied where f3 and f4 are focal lengths of said third and fourth lens units, respectively.

60. A zoom lens system according to claim 58, wherein said second lens unit has an aspherical surface.

61. A zoom lens system according to claim 58, wherein the second lens unit and the fourth lens unit move along the optical axis for zooming.

62. A zoom lens system according to claim 58, wherein a condition 0.64<(3G3R2+3G3R1)/(3G3R2−3G3R1)<1.64 is satisfied where 3G3R1 and 3G3R2, respectively, are paraxial radiuses of curvature on surfaces at the object and image sides of the second positive lens element in said third lens unit.

63. A zoom lens system according to claim 58, wherein a condition 0.08<Dab/f3<0.64 is satisfied where Dab is a separation between said first positive lens elements and said negative lens element, and f3 is a focal length of said third lens unit.

64. A zoom lens system according to claim 58, wherein a condition 0.01<(D12w+D23t)/BD2<0.84 is satisfied where D12w is a separation between said first and second lens units when said zoom lens system has the shortest focal length, D23t is a separation between said second and third lens units when said zoom lens system has the shortest focal length, and BD2 is a separation between a surface closest to the object side and a surface closest to the image side in said second lens unit.

65. A zoom lens system according to claim 58, wherein said system is an optical system for forming an image on a photoelectric conversion element.

66. An optical apparatus comprising:
a zoom lens system according to claim 58; and
a photoelectric conversion element for receiving an image formed by said zoom lens system.

* * * * *

UNITED STATES PATENT AND TRADEMARK OFFICE
CERTIFICATE OF CORRECTION

PATENT NO. : 6,606,202 B2
DATED : August 12, 2003
INVENTOR(S) : Koji Hoshi

It is certified that error appears in the above-identified patent and that said Letters Patent is hereby corrected as shown below:

Column 6,
Lines 42, 54 and 65, "fin" should read -- fm --

Column 7,
Line 10, "fin" should read -- fm --

Column 16,
Line 16, "ni and vi" should read -- ni and *vi* --

Column 29,
Line 40, "0.09<Dab/f3<0.35, 0.5<f3/f4<1.25," should read -- 0.09<Dab/f3<0.35, 0.51<f3/f4<1.25, --

Column 30,
Line 13, "zoom lens system" should read -- a zoom lens system --

Signed and Sealed this

Tenth Day of February, 2004

JON W. DUDAS
*Acting Director of the United States Patent and Trademark Office*